United States Patent
Gelvin et al.

(10) Patent No.: US 7,904,569 B1
(45) Date of Patent: Mar. 8, 2011

(54) METHOD FOR REMOTE ACCESS OF VEHICLE COMPONENTS

(76) Inventors: David C. Gelvin, Escondido, CA (US); Lewis D. Girod, Los Angeles, CA (US); William J. Kaiser, Los Angeles, CA (US); Fredric Newberg, San Diego, CA (US); Gregory J. Pottie, Los Angeles, CA (US)

( * ) Notice: Subject to any disclaimer, the term of this patent is extended or adjusted under 35 U.S.C. 154(b) by 837 days.

(21) Appl. No.: 09/680,608

(22) Filed: Oct. 4, 2000

Related U.S. Application Data

(60) Provisional application No. 60/210,296, filed on Jun. 8, 2000, provisional application No. 60/208,397, filed on May 30, 2000, provisional application No. 60/170,865, filed on Dec. 15, 1999, provisional application No. 60/158,013, filed on Oct. 6, 1999.

(51) Int. Cl.
*G06F 15/16* (2006.01)

(52) U.S. Cl. ......... 709/229; 709/220; 709/227; 709/228; 701/29; 701/33

(58) Field of Classification Search .................. 709/220, 709/223, 229, 209, 217, 228, 227; 701/200, 701/29, 33
See application file for complete search history.

(56) References Cited

U.S. PATENT DOCUMENTS

| 3,475,755 | A | 10/1969 | Bassen et al. | |
|---|---|---|---|---|
| 4,187,492 | A | 2/1980 | Delignieres | |
| 4,406,016 | A | 9/1983 | Abrams et al. | 455/19 |
| 4,494,121 | A | 1/1985 | Walter et al. | |
| 4,520,674 | A | 6/1985 | Canada et al. | 73/660 |
| 4,642,639 | A | 2/1987 | Nelson | |
| 4,649,524 | A | 3/1987 | Vance | 367/13 |
| 4,812,820 | A | 3/1989 | Chatwin | 340/518 |
| 4,855,713 | A | 8/1989 | Brunius | 340/506 |
| 4,862,422 | A | 8/1989 | Brac | |
| 4,928,246 | A | 5/1990 | Crawley et al. | |
| 4,951,029 | A | 8/1990 | Severson | 340/506 |
| 4,962,473 | A | 10/1990 | Crain | |
| 5,095,531 | A | 3/1992 | Ito | |
| 5,184,311 | A | 2/1993 | Kraus et al. | |
| 5,203,199 | A | 4/1993 | Henderson et al. | |
| 5,206,806 | A | 4/1993 | Gerardi et al. | |
| 5,241,542 | A | 8/1993 | Natarajan et al. | 370/95.3 |

(Continued)

FOREIGN PATENT DOCUMENTS

CA 2245963 2/2000

(Continued)

OTHER PUBLICATIONS

S. Natkunanathan, et al., "A Signal Search Engine for Wireless Integrated Network Sensors", ASFL Annual Symposium, Mar. 2000, pp. 1-4.

(Continued)

*Primary Examiner* — Patrice L Winder
*Assistant Examiner* — Adnan Mirza
(74) *Attorney, Agent, or Firm* — McDonnell Boehnen Hulbert & Berghoff LLP

(57) ABSTRACT

Vehicle internetworks provide for communications among diverse electronic devices within a vehicle, and for communications among these devices and networks external to the vehicle. The vehicle internetwork comprises specific devices, software, and protocols, and provides for security for essential vehicle functions and data communications, ease of integration of new devices and services to the vehicle internetwork, and ease of addition of services linking the vehicle to external networks such as the Internet.

23 Claims, 23 Drawing Sheets

U.S. PATENT DOCUMENTS

| | | |
|---|---|---|
| 5,247,564 A | 9/1993 | Zicker ............................ 379/40 |
| 5,295,154 A | 3/1994 | Meier et al. ...................... 375/1 |
| 5,369,584 A | 11/1994 | Kajiwara |
| 5,420,825 A | 5/1995 | Fischer et al. |
| 5,428,636 A | 6/1995 | Meier ........................ 375/202 |
| 5,475,687 A | 12/1995 | Markkula, Jr. et al. ...... 370/85.1 |
| 5,479,932 A | 1/1996 | Higgins et al. |
| 5,483,827 A | 1/1996 | Kulka et al. |
| 5,534,697 A | 7/1996 | Creekmore et al. |
| 5,535,380 A | 7/1996 | Bergkvist et al. |
| 5,553,076 A | 9/1996 | Behtash et al. .............. 370/95.3 |
| 5,563,948 A | 10/1996 | Diehl et al. |
| 5,615,175 A | 3/1997 | Carter et al. |
| 5,617,371 A | 4/1997 | Williams |
| 5,659,195 A | 8/1997 | Kaiser et al. .................. 257/415 |
| 5,682,142 A | 10/1997 | Loosmore et al. |
| 5,701,120 A | 12/1997 | Perelman et al. |
| 5,726,911 A | 3/1998 | Canada et al. ................. 364/550 |
| 5,732,074 A * | 3/1998 | Spaur et al. ................... 370/313 |
| 5,734,699 A | 3/1998 | Lu et al. |
| 5,737,529 A | 4/1998 | Dolin, Jr. et al. |
| 5,742,829 A | 4/1998 | Davis et al. |
| 5,745,758 A | 4/1998 | Shaw |
| 5,745,759 A | 4/1998 | Hayden |
| 5,760,530 A | 6/1998 | Kolesar |
| 5,794,164 A | 8/1998 | Beckert et al. |
| 5,852,232 A | 12/1998 | Samsaver et al. |
| 5,852,351 A | 12/1998 | Canada et al. ................. 318/490 |
| 5,854,994 A | 12/1998 | Canada et al. .................. 702/56 |
| 5,864,323 A | 1/1999 | Berthon |
| 5,889,477 A | 3/1999 | Fastenrath |
| 5,907,491 A | 5/1999 | Canada et al. ......... 364/468.15 |
| 5,937,163 A | 8/1999 | Lee et al. |
| 5,946,083 A | 8/1999 | Melendez et al. |
| 5,946,488 A | 8/1999 | Tanguay et al. |
| 5,959,529 A | 9/1999 | Kail |
| 5,973,309 A | 10/1999 | Livingston |
| 5,978,578 A | 11/1999 | Azarya et al. |
| 5,987,552 A | 11/1999 | Chittor et al. |
| 5,991,806 A | 11/1999 | McHann, Jr. |
| 6,009,363 A | 12/1999 | Beckert et al. |
| 6,011,787 A | 1/2000 | Nakano et al. |
| 6,014,406 A | 1/2000 | Shida et al. |
| 6,023,223 A | 2/2000 | Baxter, Jr. |
| 6,028,537 A | 2/2000 | Suman et al. |
| 6,028,857 A | 2/2000 | Poor |
| 6,038,436 A | 3/2000 | Priest |
| 6,048,276 A | 4/2000 | Vandergrift |
| 6,061,021 A | 5/2000 | Zibell |
| 6,078,269 A | 6/2000 | Markwell et al. .......... 340/825.5 |
| 6,114,970 A | 9/2000 | Kirson et al. |
| 6,140,957 A | 10/2000 | Wilson et al. |
| 6,144,905 A | 11/2000 | Gannon |
| 6,145,082 A | 11/2000 | Gannon et al. |
| 6,175,789 B1 * | 1/2001 | Beckert et al. .................. 701/33 |
| 6,175,868 B1 | 1/2001 | Lavian et al. |
| 6,181,994 B1 | 1/2001 | Colson |
| 6,184,798 B1 | 2/2001 | Egri |
| 6,185,491 B1 | 2/2001 | Gray |
| 6,202,008 B1 | 3/2001 | Beckert et al. |
| 6,208,247 B1 | 3/2001 | Agre et al. ..................... 340/539 |
| 6,225,901 B1 | 5/2001 | Kail, IV |
| 6,233,610 B1 | 5/2001 | Hayball et al. |
| 6,236,365 B1 | 5/2001 | LeBlanc et al. |
| 6,246,688 B1 | 6/2001 | Angwin |
| 6,246,935 B1 | 6/2001 | Buckley |
| 6,249,252 B1 | 6/2001 | Dupray |
| 6,252,544 B1 | 6/2001 | Hoffberg et al. |
| 6,255,942 B1 | 7/2001 | Knudsen |
| 6,285,899 B1 | 9/2001 | Ghaem et al. |
| 6,298,445 B1 | 10/2001 | Shostak et al. |
| 6,307,751 B1 | 10/2001 | Bodony et al. |
| 6,324,650 B1 | 11/2001 | Ogilvie |
| 6,327,607 B1 | 12/2001 | Fant |
| 6,330,499 B1 * | 12/2001 | Chou et al. ..................... 701/33 |
| 6,341,288 B1 | 1/2002 | Yach et al. |
| 6,343,218 B1 | 1/2002 | Kaneda et al. |
| 6,351,776 B1 | 2/2002 | O'Brien et al. |
| 6,389,483 B1 | 5/2002 | Larsson |
| 6,392,692 B1 | 5/2002 | Monroe |
| 6,400,953 B1 | 6/2002 | Furukawa |
| 6,414,955 B1 | 7/2002 | Clare |
| 6,425,004 B1 | 7/2002 | Hardjono |
| 6,430,164 B1 | 8/2002 | Jones |
| 6,437,692 B1 | 8/2002 | Petite et al. |
| 6,452,910 B1 | 9/2002 | Vij et al. |
| 6,453,910 B1 | 9/2002 | Lloyd |
| 6,469,639 B2 | 10/2002 | Tanenhaus et al. |
| 6,477,143 B1 | 11/2002 | Ginossar |
| 6,480,900 B1 | 11/2002 | Habert |
| 6,496,575 B1 | 12/2002 | Vasell et al. |
| 6,499,027 B1 | 12/2002 | Weinberger |
| 6,504,631 B1 | 1/2003 | Barry et al. |
| 6,505,086 B1 | 1/2003 | Dodd, Jr. et al. |
| 6,505,100 B1 | 1/2003 | Stuempfle |
| 6,507,810 B2 | 1/2003 | Razavi et al. |
| 6,532,494 B1 | 3/2003 | Frank et al. |
| 6,545,601 B1 | 4/2003 | Monroe |
| 6,546,419 B1 | 4/2003 | Humpleman et al. |
| 6,550,012 B1 | 4/2003 | Villa et al. |
| 6,563,796 B1 | 5/2003 | Saito |
| 6,580,979 B2 | 6/2003 | Payton et al. |
| 6,584,382 B2 | 6/2003 | Karem |
| 6,615,088 B1 | 9/2003 | Myer et al. |
| 6,615,099 B1 | 9/2003 | Muller et al. |
| 6,624,881 B2 | 9/2003 | Waibel |
| 6,640,145 B2 | 10/2003 | Hoffberg et al. |
| 6,661,773 B1 | 12/2003 | Pelissier et al. |
| 6,662,091 B2 | 12/2003 | Wilson et al. |
| 6,678,250 B1 | 1/2004 | Grabelsky et al. |
| 6,697,824 B1 | 2/2004 | Bowman-Amuah |
| 6,715,077 B1 | 3/2004 | Vasudevan et al. |
| 6,728,514 B2 | 4/2004 | Bandeira et al. |
| 6,735,630 B1 | 5/2004 | Gelvin et al. |
| 6,738,814 B1 | 5/2004 | Cox et al. |
| 6,779,004 B1 | 8/2004 | Zintel |
| 6,801,662 B1 | 10/2004 | Owechko et al. |
| 6,809,653 B1 | 10/2004 | Mann et al. |
| 6,813,542 B2 | 11/2004 | Peshkin et al. |
| 6,826,607 B1 | 11/2004 | Gelvin et al. |
| 6,829,437 B2 | 12/2004 | Kirby |
| 6,832,251 B1 | 12/2004 | Gelvin et al. |
| 6,859,831 B1 | 2/2005 | Gelvin et al. |
| 6,891,838 B1 | 5/2005 | Petite et al. |
| 6,911,997 B1 | 6/2005 | Okamoto et al. |
| 6,916,096 B2 | 7/2005 | Ebert |
| 6,990,080 B2 | 1/2006 | Bahl et al. |
| 7,020,701 B1 | 3/2006 | Gelvin et al. |
| 7,027,773 B1 | 4/2006 | McMillin |
| 7,049,953 B2 | 5/2006 | Monroe |
| 7,069,188 B2 | 6/2006 | Roberts |
| 7,103,511 B2 | 9/2006 | Petite |
| 7,104,955 B2 | 9/2006 | Bardy |
| 7,109,859 B2 | 9/2006 | Peeters |
| 7,120,508 B2 | 10/2006 | Peshkin |
| 7,158,758 B2 | 1/2007 | Lim et al. |
| 7,161,926 B2 | 1/2007 | Elson et al. |
| 7,207,041 B2 | 4/2007 | Elson et al. |
| 7,305,467 B2 | 12/2007 | Kaiser et al. |
| 7,383,341 B1 | 6/2008 | Saito et al. |
| 7,484,008 B1 | 1/2009 | Gelvin et al. |
| 7,577,872 B2 | 8/2009 | DiBartolomeo et al. |
| 2001/0056540 A1 | 12/2001 | Ober et al. |
| 2002/0111213 A1 | 8/2002 | McEntee |
| 2002/0154631 A1 | 10/2002 | Makansi et al. |
| 2002/0181501 A1 | 12/2002 | Nova et al. |
| 2003/0222819 A1 | 12/2003 | Karr et al. |
| 2004/0006424 A1 | 1/2004 | Joyce |
| 2004/0008651 A1 | 1/2004 | Ahmed |
| 2004/0049428 A1 | 3/2004 | Soehnlen |
| 2006/0083217 A1 | 4/2006 | Bae et al. |
| 2006/0206576 A1 * | 9/2006 | Obradovich et al. ......... 709/209 |
| 2007/0060056 A1 | 3/2007 | Whitaker |
| 2008/0015748 A1 | 1/2008 | Nagy |
| 2008/0031213 A1 | 2/2008 | Kaiser et al. |
| 2008/0126565 A1 | 5/2008 | Osano |
| 2008/0261529 A1 | 10/2008 | Rosenblatt |

| | | | |
|---|---|---|---|
| 2009/0122723 | A1 | 5/2009 | Hirano |
| 2009/0221275 | A1 | 9/2009 | Trip |
| 2009/0282458 | A1 | 11/2009 | Hjelm |
| 2009/0304009 | A1 | 12/2009 | Kolhi |
| 2010/0057290 | A1 | 3/2010 | Brillhart |

FOREIGN PATENT DOCUMENTS

| | | |
|---|---|---|
| DE | 19743137 | 4/1999 |
| EP | 0814393 | 12/1997 |
| WO | 9917477 | 4/1999 |
| WO | 0054237 | 9/2000 |

OTHER PUBLICATIONS

Michael J. Dong, et al., "Low Power Signal Processing Architectures for Network Microsensors", 1997 International Symposium on Low Power Electronics and Design; Digest of Technical Papers (1997) pp. 173-177.

Tsung-Hsien Lin, et al., "CMOS Front End Components for Micropower RF Wireless Systems", Proceedings of the 1998 International Symposium on Low Power Electronics & Design, pp. 11-15, Aug. 1998.

G. Asada, et al.., "Wireless Integrated Network Sensors: Low Power Systems on a Chip", Proceedings of the 1998 European Solid State Circuits Conference (ESSCIRC), pp. 1-8 The Hague, The Netherlands, Sep. 22-24, 1998.

Gregory J. Pottie, R&D Quarterly and Annual Status Report for AWAIRS, pp. 1-28; Jan. 1, 1999-Apr. 31, 1999.

Gregory J. Pottie, et al., Wireless Integrated Network Sensors: Towards Low Cost and Robust Self-Organizing Security Networks, SPIE Conference on Sensors, C3I, Information and Training Tech. for Law Enforcement, Boston, MA.; pp. 1-10; Nov. 3-5, 1998.

Loren P. Clare, et al., "Self-Organizing Distributed Sensor Networks", SPIE $13^{th}$. Annual Symposium on Aerosense/Defense Sensing, Simulation and Controls, UGS Technologies and Applications Conference, Orlando, Florida; pp. 1-9; Apr. 5-9, 1999.

J. Agre, et al., "Autoconfigurable Distributed Control Systems", Proceedings of the $2^{nd}$. International Symposium on Autonomous Decentralized Systems (ISADS 95), Phoenix, Arizona; pp. 1-8; Apr. 25-27, 1995.

Jonathan R. Agre, et al., "Development Platform for Self-Organizing Wireless Sensor Networks", SPIE $13^{th}$. Annual Symposium on Aerosense/Defense Sensing, Simulation and Controls, Unattended Ground Sensor Technologies adn Applications Conference, Orlando, Florida; pp. 1-12; Apr. 5-9, 1999.

Ann Bhatnagar, et al., "Layer Net: A New Self-Organizing Network Protocol"; 1990 IEEE Military Communications Conference, Monterey, CA., Sep. 30 thru Oct. 3; pp. 845-849.

Norman Abramson, "The Throughput of Packet Broadcasting Channels", IEEE Transactions on Communications, vol. Com-25, No. 1, Jan. 1977, pp. 117-128.

C. David Young, "USAP: A Unifying Dynamic Distributed Multichannel TDMA Slot Assignment Protocol", Milcom 96 Conference Proceedings, Oct. 22-24, 1996, pp. 235-239.

G. Asada, et al."Low Power Wireless Communication and Signal Processing Circuits for Distributed Microsensors", Proceedings of 1997 IEEE International Symposium on Circuits and Systems; Jun. 9-12, 1997, Hong Kong, pp. 2817-2820.

K. Bult, et al."Low Power Systems for Wireless Microsensors", 1996 International Symposium on Low Power Electronics and Design; pp. 17-21.

Anthony Ephremides, et al."A Design Concept for Reliable Mobile Radio Networks with Frequency Hopping Signaling"; Proceedings of the IEEE, vol. 75, No. 1, Jan. 1987; pp. 56-73.

K. Bult, et al., "Wireless Integrated Microsensors"; Solid-State Sensor and Actuator Workshop, Hilton Head South Carolina, Jun. 3-6, 1996, pp. 205-210.

C. David Young, "A Unifying Dynamic Distributed Multichannel TDMA Slot Assignment Protocol", Rockwell International Working Paper, Oct. 25, 1995, pp. 1-29.

Tsung-Hsien Lin, et al, "Wireless Integrated Network Sensors (WINS) for Tactical Information Systems", Rockwell Science Center, Thousand Oaks, Jan. 1998, pp. 1-6.

Michael J. Dong, et al."Low Power Signal Processing Architectures for Network Microsensors"; University of California, Los Angeles, ISLPED 97, International Symposium on Low Power Electronics and Design, Jan. 1998, pp. 1-5.

Asada, G., et al., "Wireless Integrated Network Sensors (WINS)" Proceedings of the SPIE, SPIE, Bellingham, VA 3673:11-18 (1999).

Lohle, H., et al., "Bordermaster 2000- An Advanced Border Surveillance System", Electrical Communication, Alcatel. Brussels, BE 153-158 (1994).

K. Sohrabi, J. Gao, V. Ailawadhi, G. Pottie, "A Self-Organizing Wireless Sensor Network," Proc. $37^{th}$ Allerton Conf. On Comm., Control, and Computing, Monticello, IL, Sep. 1999.

D.J. Baker and A. Ephremides, "The Architectural Organization of a Mobile Radio Network via a Distributed Algorithm," IEEE Transactions on Communications, vol. Com-29, No. 11, Nov. 1981, pp. 1694-1701.

J. Elson, L. Girod, and D. Estrin, "Fine-Grained Network Time Synchronization Using Reference Broadcasts," submitted to SIGCOMM 2002.

W. Merrill, K. Sohrabi, L. Girod, J. Elson, F. Newberg, and W. Kaiser, "Open Standard Development Platforms for Distributed Sensor Networks," Aerosense Conference, Orlando, FL, Apr. 2002.

M. Gerla and J. Tzu-Chieh Tsai, "Multicluster, Mobile, Multimedia Radio Network," ACM-Baltzer Journal of Wireless Networks, vol. 1, No. 3, pp. 255-265, 1995.

C. R. Lin and M. Gerla, "Adaptive Clustering for Mobile Wireless Networks."

U.S. Appl. No. 09/684,388, filed Oct. 4, 2000.
U.S. Appl. No. 09/684,387, filed Oct. 4, 2000.
U.S. Appl. No. 09/685,018, filed Oct. 4, 2000.
U.S. Appl. No. 09/684,162, filed Oct. 4, 2000.
U.S. Appl. No. 09/684,742, filed Oct. 4, 2000.

Wesson et al., "Network Structures for Distributed Situation Assessment," IEEE Transactions on Systems, Man, and Cybernetics., vol. SMC-11, 1:5-23 (Jan. 1981).

Iyengar et al., "Information Routing and Reliability Issues in Distributed Sensor Networks," IEEE Transactions on Signal Processing, 40(12):3012-3021 (Dec. 1992).

Bhatnagar et al., "Layer Net: A New Self-Organizing Network Protocol," 1990 IEEE Military Communications Conference, Monterey, CA pp. 0845-0849.

Abramson, "The Throughput of Packet Broadcasting Channels," IEE Transactions on Communications, vol. COM-25, No. 1, 117-128, Jan. 1977.

Young, "USAP: A Unifying Dynamic Distributed Multichannel TDMA Slot Assignment Protocol," Milcom 96 Conference Proceedings, pp. 235-239 1996 IEEE.

Asada et al., "Low Power Wireless Communication and Signal Processing Circuits for Distributed Microsensors," Proceedings of 1997 IEEE International Symposium on Circuits and Systems, (The IEEE Circuits and Systems Society), 2817-2820, Jun. 9-12, 1997, Hong Kong.

Bult et al., "Low Power Systems for Wireless Microsensors," 1996 International Symposium on Low Power Electronics and Design, pp. 17-21 (1996).

Ephremides et al., "A Design Concept for Reliable Mobile Radio Networks with Frequency Hopping Signaling," Proceedings of the IEEE, 75(1):56-73, 1987.

Bult et al. "Wireless Integrated Microsensors," Solid-State Sensor and Actuator Workshop, pp. 205-210, 1996.

Young, "A Unifying Dynamic Distributed Multichannel TDMA Slot Assignment Protocol," Rockwell International, pp. 1-29 (1995).

Lin et al., "Wireless Integrated Network Sensors (WINS) for Tactical Information Systems," Rockwell Science Center, Thousand Oaks, pp. 1-6, Jan. 1998.

Asada et al., "Wireless Integrated Network Sensors: Low Power Systems on a Chip,", ESSCIRC '98, Proceedings of the 24th European Solid-State Circuits Conference, Sep. 22-24, 1998, pp. 9-16 (1998).

Vardhan et al., "WINS: Distributed in Situ Sensing for Mission and Flight Systems," Aerospace Conference Proceedings, IEEE, 7:459-463, Mar. 18-25, 2000.

Pottie et al., "Wireless Integrated Network Sensors," Communications of the ACM, 43(5):51-58 (May 2000).

International Search Report for PCT/US00/27764 mailed Feb. 1, 2001.

International Search Report for PCT/US00/27515 mailed Oct. 18, 2001.

International Search Report for PCT/US00/27514 mailed Oct. 18, 2001.

International Search Report for PCT/US00/27513 mailed Oct. 18, 2001.

International Search Report for PCT/US00/27675 mailed Oct. 18, 2001.

International Search Report for PCT/US00/27793 mailed Oct. 23, 2001.

International Search Report for PCT/US00/27763 mailed Oct. 23, 2001.

International Search Report for PCT/US00/27604 mailed Oct. 18, 2001.

International Search Report for PCT/US00/27603 mailed Oct. 18, 2001.

International Search Report for PCT/US00/27602 mailed Oct. 23, 2001.

International Search Report for PCT/US00/27601 mailed Oct. 23, 2001.

International Search Report for PCT/US00/27600 mailed Oct. 18, 2001.

W. Merrill, K. Sohrabi, L. Girod, J. Elson, F. Newburg & W. Kaiser, "Open Standard Development Platforms for Distributed Sensor Networks," Proceedsings of SPIE, Unattended Ground Sensor Technologies and Applications IV, AeroSense 2002, vol. 4743, Apr. 2-5, 2002, Orlando, FL, pp. 327-337.

D. Estrin, G.J. Pottie & M. Srivastava, "Instrumenting the work with wireless sensor networks," ICASSP 2001, Salt Lake City, May 7-11, 2001.

Gelvin et al., U.S. Appl. No. 12/710,218, filed Feb. 22, 2010.
Gelvin et al., U.S. Appl. No. 12/758,748, filed Apr. 12, 2010.
Gelvin et al., U.S. Appl. No. 09/684,706, filed Oct. 4, 2000.

* cited by examiner

| SERVICES 1602 | APPLICATION SUPPORT | DATABASE SERVICES | ROUTING | SECURITY | NETWORK MANAGEMENT | DEPLOYMENT |
|---|---|---|---|---|---|---|
| HOST 1604 | GATEWAY | GATEWAY | GATEWAY | GATEWAY AND IPC NODES | GATEWAY AND IPC NODES | GATEWAY AND IPC NODES |
| API EXAMPLES 1606 | •Diagnostics<br>•Event Detection | •Network attributes<br>•Device attributes<br>•Diagnostic data | •Packet routing to<br>•IDB-C<br>•Bluetooth<br>•IEEE 1394<br>•MOST<br>•Internet | •User account management<br>•Entry security<br>•OEM bus access security<br>•Internet access security<br>•Authentication<br>•Verification<br>•Privacy | •Network status<br>•SNMP services<br>•IPC node access control | •Discovery<br>•Initialization<br>•Configuration |

FIG. 16

METHOD FOR REMOTE ACCESS OF VEHICLE COMPONENTS

RELATED APPLICATIONS

This application claims the benefit of United States Provisional Application No. 60/158,013, filed Oct. 6, 1999, U.S. Provisional Application No. 60/170,865, filed Dec. 15, 1999, U.S. Provisional Application No. 60/208,397, filed May 30, 2000, U.S. Provisional Application No. 60/210,296, filed Jun. 8, 2000, United States Patent Application Number (to be assigned-reference number 21200.702), filed Oct. 4, 2000, United States Patent Application Number (to be assigned-reference number 21200.706), filed Oct. 4, 2000, United States Patent Application Number (to be assigned-reference number 21200.707), filed Oct. 4, 2000, United States Patent Application Number (to be assigned-reference number 21200.708), filed Oct. 4, 2000, United States Patent Application Number (to be assigned-reference number 21200.709), filed Oct. 4, 2000, United States Patent Application Number (to be assigned-reference number 21200.710), filed Oct. 4, 2000, United States Patent Application Number (to be assigned-reference number 21200.711), filed Oct. 4, 2000, United States Patent Application Number (to be assigned-reference number 21200.712), filed Oct. 4, 2000, United States Patent Application Number (to be assigned-reference number 21200.713), filed Oct. 4, 2000, United States Patent Application Number (to be assigned-reference number 21200.714), filed Oct. 4, 2000, and United States Patent Application Number (to be assigned-reference number 21200.715), filed Oct. 4, 2000, all of which are incorporated by reference.

GOVERNMENT LICENSE RIGHTS

The United States Government may have certain rights in some aspects of the invention claimed herein, as the invention was made with United States Government support under award/contract number DAAD16-99-C-1024 issued by US AMCAC NATICK Contracting Division.

BACKGROUND

1. Field of the Invention

This invention relates to the field of intelligent networks that include connection to the physical world. In particular, the invention relates to providing distributed network and Internet access to processors, controls, and devices in vehicles.

2. Description of Related Art

Typical modern vehicles include an information network within the vehicle, installed by the manufacturer. Many of the devices on this network are typically connected via a number of networks for different functions. In the near future it is expected that some of these functions will be consolidated so that a diverse set of applications will use a common Original Equipment Manufacturer (OEM) bus. The Control Area Network (CAN) is a typical protocol used for such networks in the automotive industry. By this means, sensors, actuators, and computing elements for controlling the operations can all be linked in a common environment. This reduces the wiring within the vehicle, and allows for cost reduction in that the number of different kinds of interfaces is vastly reduced. Because the OEM bus or functionally equivalent set of networks carries messages related to essential safety and security operations of the vehicle, only devices authenticated by the manufacturer can be added. In particular, the OEM bus needs to be guarded against devices that may cause congestion through repeated service requests, or malicious devices that issue commands that may imperil vehicle operation or safety. Further, each manufacturer may potentially use different protocols on their own set of buses or proprietary buses. Consequently, it is costly to add consumer electronics to vehicles, or to perform upgrades of the information network.

In order to address some of the limitations of present-day vehicle information networks, the Automotive Multimedia Interface Consortium (AMI-C) has developed a set of common specifications for a multimedia interface to motor vehicle electronic systems. A particular aim is to accommodate a wide variety of consumer electronic and computer-based devices in the vehicle. The AMI-C standard network architecture, adopted by nearly all automobile manufacturers worldwide, reduces time to market and facilitates upgrades of vehicle electronics, supports deployment of telematics by providing standard interfaces, and reduces relative costs of electronic components. A variety of standards are being considered for AMI-C buses, among them IEEE 1394, MOST, and Intelligent Data Bus (MB-C), with the possibility of multiple AMI-C approved buses within a vehicle.

Particular goals of the AMI-C forum are directed towards device interoperability, software interoperability, telematics support, logical security management, failsafe operation, and remote operation and service support. Device interoperability relates to the issue that consumer electronic devices and computer devices must interoperate with other systems installed in the vehicle, including communication, navigation, diagnostic and other systems.

Software interoperability relates to the issue that systems must support convenient, automatic discovery and intialization of software and hardware introduced into the vehicle by consumers, service organizations, or the vehicle manufacturer. Software portability, serviceability, and upgradeability are requirements within software interoperability.

Telematics support relates to the issue that voice and data communication must be provided for each of the installed devices or devices that may have been introduced into the passenger compartment. Logical security management relates to the issue that security services must be provided for access to vehicle data and systems. In particular, isolation must be provided between essential vehicle systems and any unauthorized local or remote access attempts.

Failsafe operation relates to the issue that some means for physical isolation between consumer and vehicle OEM bus must be provided. Thus, consumer electronics cannot be allowed to interfere in any way with the safe operation of the vehicle. Remote operation and service support relates to the issue that the network system must provide remote access for authorized vehicle users and service providers.

While the goals of the AMI-C forum include desirable features, a standards body only issues requirements without providing means for solution. Beyond the requirements expressed by the AMI-C forum, it is also desirable to have a complete, lasting solution for vehicle Internet access, with connectivity throughout the life cycle of the vehicle. Connectivity should begin in manufacturing and proceed through testing, distribution, sales, field use, maintenance, recall upgrade, and used vehicle sales. Desirable features of such a system include: connectivity available on a national scale; connectivity to vehicles in all environments where the vehicle will be found using common hardware; connectivity in indoor and outdoor environments; and, scalability such that only a limited number of transactions are used for access to vast numbers of vehicles.

Further desirable features include: local information processing services at the vehicle internetworking component that reduce the communication payload using reconfigurable systems; a single infrastructure solution for vehicle and Internet access over its life cycle; operation with a single national network service provider without the requirement of region-by-region negotiation with subscriber service providers; robust operation through atomic transaction methods to enable deployment on vehicles using available power sources; secure operation that provides privacy and authentication; low component cost at both the vehicle node and the Internet access points; capability for rapid, low cost, after-market deployment of the connectivity solution; ability to deploy large (100 kb-100 Mb) data sets at a high speed and low cost; and, the use of standard web browsing tools and database technology.

Network access to vehicles must be convenient and support mobility. Thus, wireless services are attractive. Conventional methods for wireless network access to vehicles include cellular telephony, cellular data packet delivery (CDPD) services, and satellite communication. Each of these conventional services requires high subscription fees and high component costs. The RF transceivers used for support of these networks must provide low bit error rates over long range links. This demands high performance systems and high transmitter power.

Consumer devices on an OEM or AMI-C bus could supply connectivity and Internet access solutions for cellular, CDPD, satellite communication, and other wireless services. While these services can be important components of the system, conventional network solutions present some limitations. For example, conventional systems are often not easily accessible on a national scale and, typically, only provide patchwork coverage. Conventional systems may require separate negotiations for service in each region.

Conventional services do not supply connectivity to vehicles in all environments. The conventional wireless services do not provide connectivity in typical assembly, maintenance, storage, and distribution environments at required latencies and costs. Different communications means are required for indoor and outdoor environments, without convenient linkage of these communications systems. Conventional services are not scalable such that only a limited number of transactions are required for access to vast numbers of vehicles. For example, a vast number of circuit switched calls must be placed on low rate channels. Local information processing services at the vehicle internetworking component that reduce required communication payload using reconfigurable systems are not available in conventional systems.

Conventional services may require separate, regional negotiations for some services, which is a substantial obstacle to national or international deployment. Conventional services do not provide atomic transaction methods that verify completeness of transactions. For example, a cellular system will simply drop calls, with the likelihood of requiring a fresh start on a bulk data transfer. The low power operation required for deployment on vehicles using, for example, available diagnostic port power sources is not compatible with conventional long range wireless communications. Secure operation that provides privacy and authentication is not available in conventional systems.

Conventional long range wireless services require high component cost wireless devices, which is an obstacle to rapid, low cost, after-market deployment of the connectivity solution. Conventional systems lack the ability to deploy large (100 kb-100 Mb) data sets at low cost and at high speed.

Conventional means of self-assembly, while bringing a number of advantages, also have some limitations. For example, the Jini protocol is designed to enable assembly of functions on the Internet. It applies not to the original physical connection and assignment of internet protocol (IP) addresses, but rather to groups of users who are already connected and who desire particular services. Requests are made to a central server, which downloads the appropriate software and enables set up of a session among scattered nodes. While the Jini protocol is heavy in the sense of demanding considerable memory and hardware support, it is robust over a variety of networks and extensive support software exists. Thus, while not a complete solution to the problem of self-assembly, it is desirable for a vehicle network to be able to interact with Jini servers, and to support Jini for those devices with the capability of hosting its applications.

SUMMARY

A vehicle internetwork is provided comprising an information and control internetwork for vehicles, including hardware together with a suite of applications. The vehicle internetwork enables the secure and convenient addition of devices and software to a vehicle network. Among the functions supported are formation of subnetworks, authentication of new devices added to the network, bridging between heterogeneous networks, routing and security for multimedia traffic, and control of traffic based on priorities and security level. The vehicle internetwork permits secure operation of the internetwork and coupled devices in response to snooping, replay, denial of service, and unauthorized access attacks, with minimal intervention required by the vehicle operator or manufacturer. Further, mobile couplings to outside networks including the Internet are supported and, in contrast to conventional networking, most configuration takes place automatically and with no intervention by a vehicle owner. A modular architecture enables distribution of functions, simplifying upgrades over the lifetime of the vehicle. Standard interfaces provide a universal socket, so that devices may be added irrespective of the make, model, or type of vehicle.

The descriptions provided herein are exemplary and explanatory and are intended to provide examples of the claimed invention.

BRIEF DESCRIPTION OF THE FIGURES

The accompanying figures illustrate embodiments of the claimed invention. In the figures:

FIG. 16 is a vehicle internetwork application programming interface (API) structure of an embodiment.

DETAILED DESCRIPTION

Figure 1:
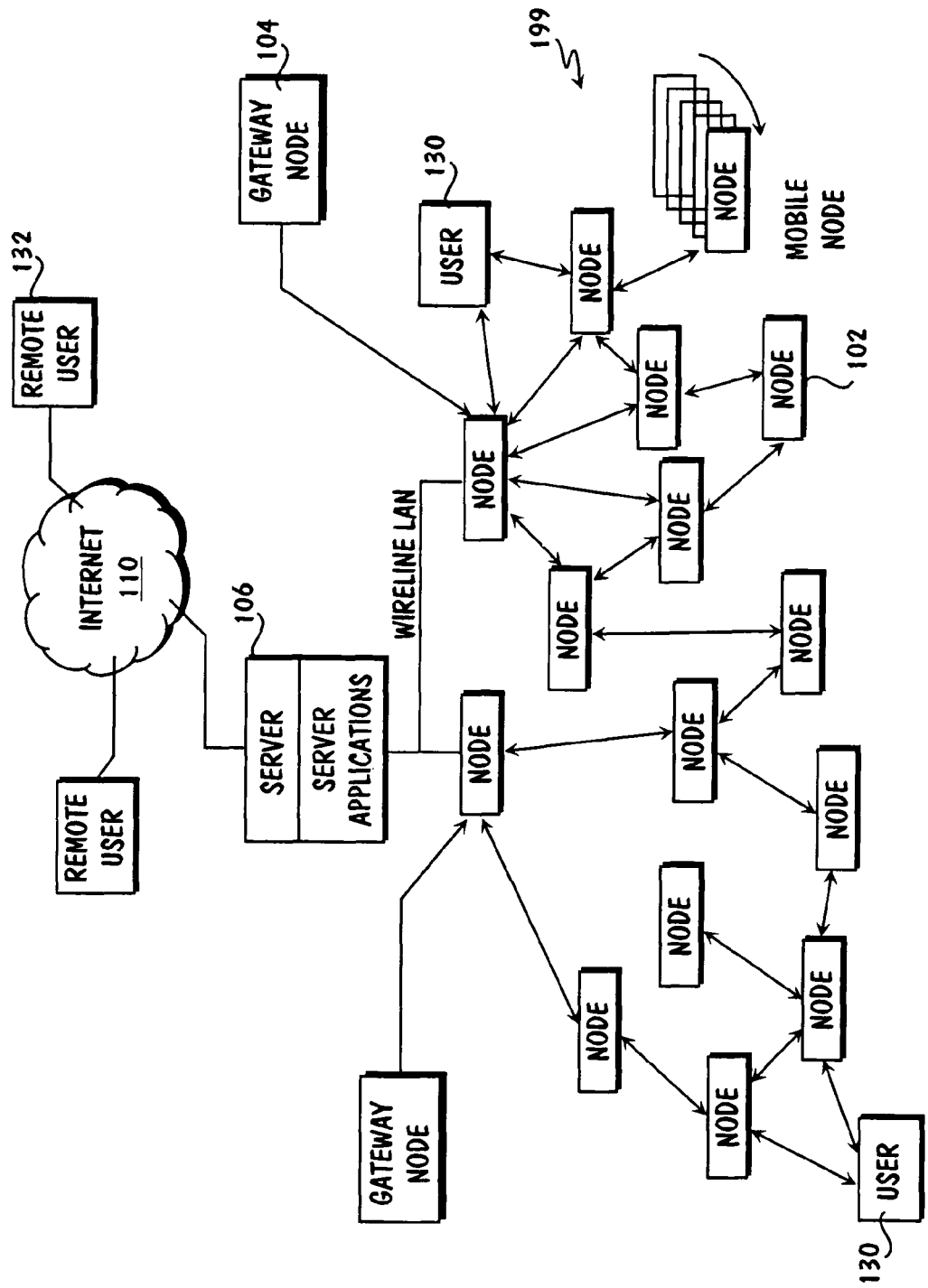
FIGS. 1 and 2 are a Wireless Integrated Network Sensor Next Generation (WINS NG) network architecture of an embodiment.

The Wireless Integrated Network Sensor Next Generation (WINS NG) sensors and nodes provide distributed network and Internet access to sensors, controls, and processors that are deeply embedded in equipment, facilities, and the environment. The WINS NG network is a new monitoring and control capability for applications in such sectors as transportation, manufacturing, health care, environmental monitoring, and safety and security. Wireless Integrated Network Sensors combine microsensor technology, low power signal processing, low power computation, and low power, low cost wireless (and/or wired) networking capability in a compact system. The WINS NG networks provide sensing, local control, and embedded intelligent systems in structures, materials, and environments.

The WINS NG networks provide a more efficient means of connecting the physical and computer worlds. Sensor nodes self-organize to form a network, and seamlessly link to the Internet or other external network via a gateway node, which can be of the same type or different from the sensor nodes. The sensor nodes can themselves be of the same type or a variety of types. Network resources such as databases are available to the sensor network and the remote user through the Internet or other external network.

The sensor nodes are constructed in a layered fashion, both with respect to signal processing and network protocols, to enable use of standard tools, ease real-time operating systems issues, promote adaptability to unknown environments, simplify reconfiguration, and enable lower-power, continuously vigilant operation. High reliability access to remote WINS NG nodes and networks enables remote interrogation and control of the sensor network. This reliability is achieved using a plurality of couplings, with automatic adjustment of the processing and communications to deal with failures of any of these couplings. Linkage to databases enables extra resources to be brought to bear in analysis and archiving of events, and database methods can be used to control the entire network in a more transparent manner, to enable more efficient control and design.

The WINS NG technology incorporates low-energy circuitry and components to provide secure communication that is robust against deliberate and unintentional interference, by means for example of new algorithms and antenna designs. The network can further include distributed position location functionality that takes advantage of the communications and sensing components of the individual nodes, to simplify deployment and enable location of targets.

The sensor nodes can be of a variety of types, including very simple nodes that may, for example, serve as tags. These nodes can be constructed on flexible polymer substrates, a material that may be used for a wide variety of synergistic uses. This construction results in more compact and capable systems, providing sensors, actuators, photo-cells and structural properties. Compact antennas for such packages have been developed. The network includes both wireless and wired communications capability, using a common protocol and automatically choosing the more secure or lower power mode when it is available, providing more robust and long-lived operation in potentially hostile environments. The network enables a wide variety of users with different data rate and power requirements to coexist as, for example, in wired or wireless mode vehicular applications. The flexibility of the design opens a wide variety of applications.

In another aspect, the layering of the WINS nodes with respect to processing and signal processing facilitates the rapid design of new applications. Layering further facilitates self-organization of complete applications, from network couplings through to interoperation with remote databases accessed through external networks such as the Internet. With this layering, the cost of deployment is radically reduced even while remote operation is enabled.

Figure 2:
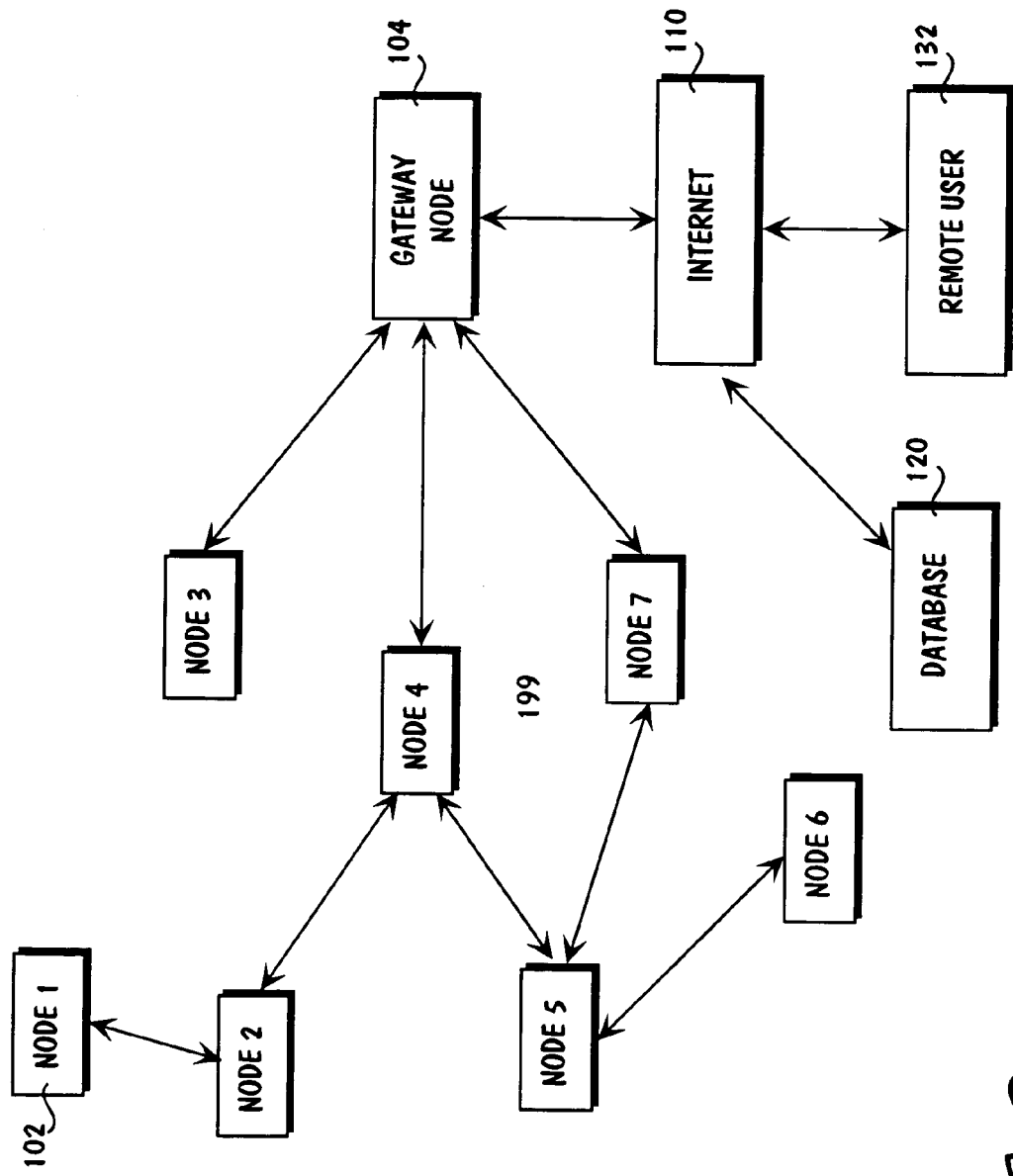

FIGS. 1 and 2 show embodiments of a WINS NG network. The network includes nodes 102, gateway nodes 104, server 106, and web assistants or node control web or browser pages (not shown), but is not so limited. The sensor nodes 102 include any combination of actuators, sensors, signal processors, energy or power supplies, data storage devices, wireless communication devices, wireline communication devices, and self-location capabilities. The sensor nodes 102 are distributed in an environment 199 that is to be monitored or controlled. The network can include heterogeneous elements. Local users 130 may interact, if authenticated, with the network via the nodes 102 themselves through a local display and user interfaces (UIs). Non-local users can interact with the network through gateways 104. Thus, couplings to servers 106, database services 120, and other network resources are available, and user 132 can access the network with standard tools. The user or client computer can access the WINS network continuously or intermittently, and may interface via processors of vastly different capabilities according to a particular application (e.g., personal computers, personal digital assistants (PDAs), or bidirectional pagers). A complete sensor network may, in one embodiment, be viewed as a distributed but active database that answers questions about the physical world, and acts upon the questions through the actuators. Multihop communication permits low power operation of dense WINS sensor networks.

The network architecture of FIGS. 1 and 2 is self-organizing with respect to an ability to distribute some combination of information and energy. The network interacts with remote users 132 and databases 120 when coupled to the Internet 110 or other networks using a gateway 104. The WINS node data is transferred over the possibly asymmetric wireless link to an end user 132 or to a conventional wireless network service, for example an Internet Protocol (IP) network 110, through a WINS gateway 104 or a network bridge. Internetworking provides remote accessibility via web-based tools to data (e.g., signals and images), code (e.g., signal processing, decision support, and database elements), management (e.g., node and network operation), and security functions.

The sensor nodes of an embodiment are remotely programmable. Furthermore, software is downloadable from storage locations in the sensor node network, or via the Internet from remote user locations or databases. Moreover, results or data products of sensor nodes may be remotely queried. Additionally, the network is capable of supporting distributed processing and data storage functions in accordance with varying sensor node capabilities and application demands.

The WINS NG architecture readily accommodates the AMI-C goals. The WINS NG network includes a WINS NG gateway node and any number of other nodes that include a combination of sensing, signal processing, actuation, and communications capabilities. The gateway couples to external networks such as the Internet. The network self-assembles, both with respect to establishment of the physical connectivity and in assembling applications. Through a set of open APIs, standard web browsers and database tools are used to control the operations of the network, request particular types of information, and archive the information of interest. The gateway and other WINS NG nodes include as components the sensors and actuators, communications ports that support both wired and wireless communications, a real-time processor, and a higher level processor.

The WINS NG node and network architecture is well-suited for adaptation to and support of vehicular applications wherein, for example, a WINS NG gateway functions to bridge the OEM and AMI-C buses while providing couplings with external networks via at least one wireless port. Specifically, therefore, the WINS NG network includes a superset of the functions used in the core components of a vehicle internetwork. Thus, while WINS NG networks can include nodes with sensing, signal processing, and communications capabilities, the core network components of vehicular networks may not use sensors, just as embodiments or configurations of the WINS NG gateway may not include sensors. However, the vehicle internetwork embodiments of the WINS NG technology do make use of the self-assembly, layered and open API set, separation of real-time and general purpose processing functions, and ease of connectivity to external networks and databases characteristic of WINS NG networks. Consequently, the vehicle internetwork of an embodiment is regarded as a network including vehicle-specific configurations of WINS NG nodes.

The WINS vehicle internetwork of an embodiment provides an information and control internetwork for vehicles, including the associated hardware, together with a suite of applications. An embodiment of the vehicle internetwork disclosed and claimed herein includes a wireline/wireless automotive gateway, programmable IDB-C bus interfaces, and complete internetworked vehicle systems. Automotive Multimedia Interface Consortium (AMI-C) network functions, including telematics, access to vehicle data systems, and security are enabled in this vehicle internetwork using open interfaces that enable interaction with standard web-based software, tools, and databases. The vehicle internetwork leverages the development of hybrid wireless, wireline networked embedded systems, described in U.S. Provisional Application No. 60/158,013, filed Oct. 6, 1999, U.S. Provisional Application No. 60/170,865, filed Dec. 15, 1999, U.S. Provisional Application No. 60/208,397, filed May 30, 2000, U.S. Provisional Application No. 60/210,296, filed Jun. 8, 2000, United States Patent Application Number (to be assigned-reference number 21200.702), filed Oct. 4, 2000, United States Patent Application Number (to be assigned-reference number 21200.706), filed Oct. 4, 2000, United States Patent Application Number (to be assigned-reference number 21200.707), filed Oct. 4, 2000, United States Patent Application Number (to be assigned-reference number 21200.708), filed Oct. 4, 2000, United States Patent Application Number (to be assigned-reference number 21200.709), filed Oct. 4, 2000, United States Patent Application Number (to be assigned-reference number 21200.710), filed Oct. 4, 2000, United States Patent Application Number (to be assigned-reference number 21200.711), filed Oct. 4, 2000, United States Patent Application Number (to be assigned-reference number 21200.712), filed Oct. 4, 2000, United States Patent Application Number (to be assigned-reference number 21200.713), filed Oct. 4, 2000, United States Patent Application Number (to be assigned-reference number to 21200.714), filed Oct. 4, 2000, and United States Patent Application Number (to be assigned-reference number 21200.715), filed Oct. 4, 2000, and incorporated herein by reference.

Among the functions provided by the WINS vehicle internetwork of an embodiment are device and software interoperability, telematics support, communication security and privacy, isolation of essential functions of the vehicle from consumer applications, remote operation, scalability, flexibility, open interfaces, support for local area wireless networks, accommodation of diverse device speeds on buses, and low cost. This vehicle internetwork further includes improved techniques: for enabling secure and convenient incorporation of diverse devices and software; and, to resist denial of service, snooping, and replay attacks and unauthorized access to the network. A security architecture with security implemented at network ports and a proxy is also disclosed. This port and proxy security architecture further enables simplified means for connecting both Internet Protocol (IP) capable and non-IP capable devices to the network, and permits convenient upgrades through addition of new devices throughout the lifetime of the vehicle.

The WINS vehicle internetwork can be used in a wide variety of applications, including vehicle assembly, vehicle maintenance, fleet management, fleet reliability analysis, anti-theft systems, support for entertainment systems, coordination of vehicle systems with consumer electronics, and targeted advertising. Among the advantages of the invention in enabling this broad range of vehicle reliability and consumer services are: its self-assembly and authentication from physical layer through to applications; application programming interfaces (APIs) that provide the ability to control physical parameters while using high-level and standard software tools; the separation of real time from non-real time processing; the proxy/port architecture; the integrated management of databases, CPU, internet access, and control (the network resources); and use of web tools and remote databases. These all contribute to low cost deployment and operation, and flexibility in the design of applications.

Vehicle Internetworking Architecture

Figure 3:
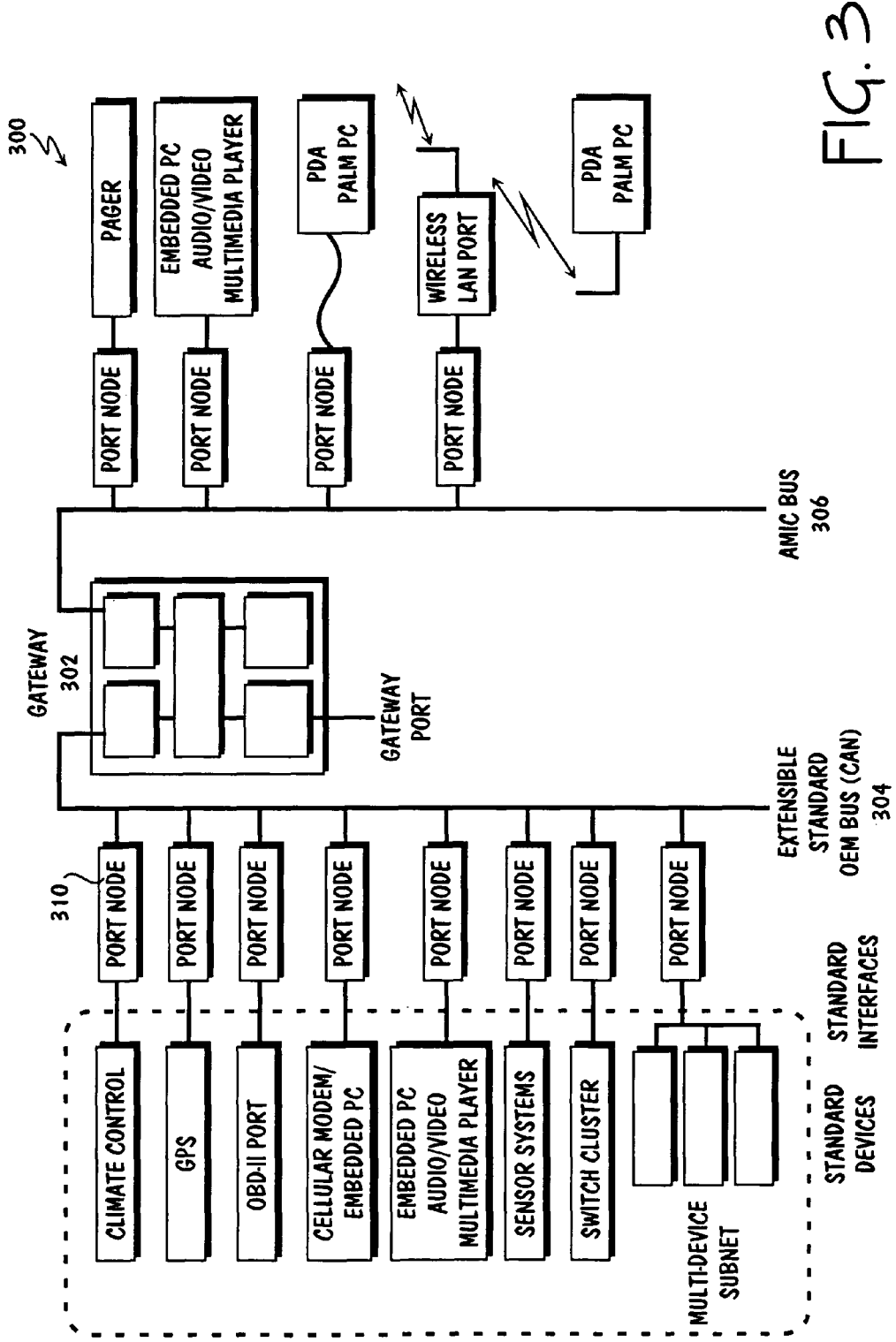
FIG. 3 is a WINS vehicle internetwork architecture of an embodiment that provides scalable, secure, flexible, and low cost networking.

FIG. 3 is a WINS vehicle internetwork architecture 300 of an embodiment that provides scalable, secure, flexible, and low cost networking. While enabling the Automotive Multimedia Interface Consortium (AMI-C) network features, further services and features are enabled, as described herein. The WINS vehicle internetwork includes a gateway 302 that links external networks and the Original Equipment Manufacturer (OEM) 304 and AMI-C buses 306. The gateway 302 provides protocol translation, security, and privacy functions in bridging these networks, and can act as a network master for any of these networks as well as coordinate applications that span multiple networks.

The WINS vehicle internetwork gateway 302 is distinguished by the ability to control the flow of information between vehicle networks, and between these networks and external networks. Consequently, a separation is provided between the devices that communicate and those that control the communication. The port nodes 310 provide protocol translation for devices and networks connected to either bus 304 or 306, and additionally enable security functions to prevent unauthorized or misbehaving devices from disrupting the network.

Devices and functions supported on the OEM bus 304 through port nodes 310 include, but are not limited to, climate control, position location devices, Global Positioning System (GPS) devices, OBD-II port, cellular modems/embedded processor, video/audio, multimedia players/embedded processor, sensor systems, switch clusters, and multiple device subnetworks. Devices and functions supported on the AMIC bus 306 through port nodes 310 include, but are not limited to, pagers, video/audio, multimedia players/embedded processor, personal digital assistants, and wireless local area network (LAN) ports.

This is but one example of the network topologies enabled by the WINS vehicle internetwork technology. For example, port nodes can bridge to subnetworks consisting of numerous devices like wired sensor/actuator systems such as WINS NG networks or devices, or wireless Bluetooth networks for consumer devices. Further, multiple gateways can be included to enable additional high speed networks to be overlaid. The WINS vehicle internetwork technology enables changes to the topology by means of its protocols for self-organization and its modular construction. This further extends to external networks. The APIs and protocols enable convenient coupling to external networks, and use of standard tools so that the network can be queried and, to some extent, controlled by authorized remote users.

Figure 4:
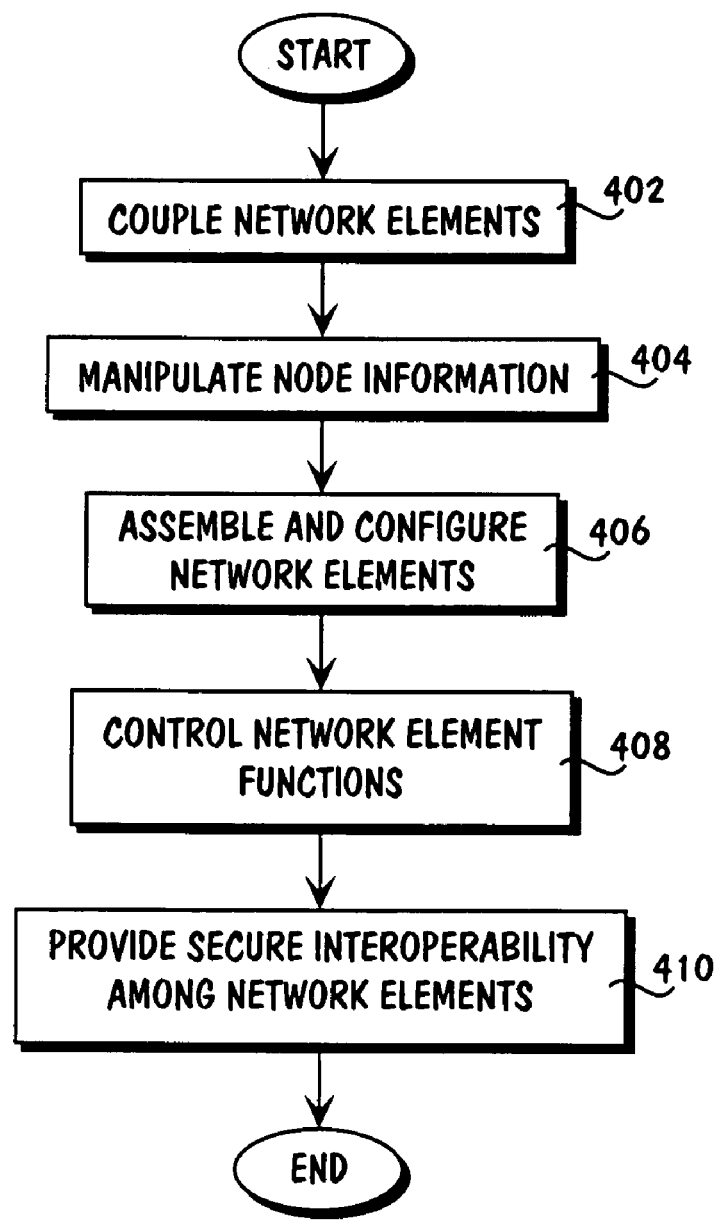
FIG. 4 is flow diagram of vehicle internetworking of an embodiment.

FIG. 4 is flow diagram of vehicle internetworking of an embodiment. A number of network elements including at least one node and at least one vehicle bus are coupled among at least one peripheral electronic device 402. Node information is manipulated, including configuration information and security information 404. In response to the node information, the network elements are automatically assembled and configured 406. Functions of the network elements are remotely controlled 408. Further, secure interoperability is provided among the network elements in response to the node information 410.

Figure 5:
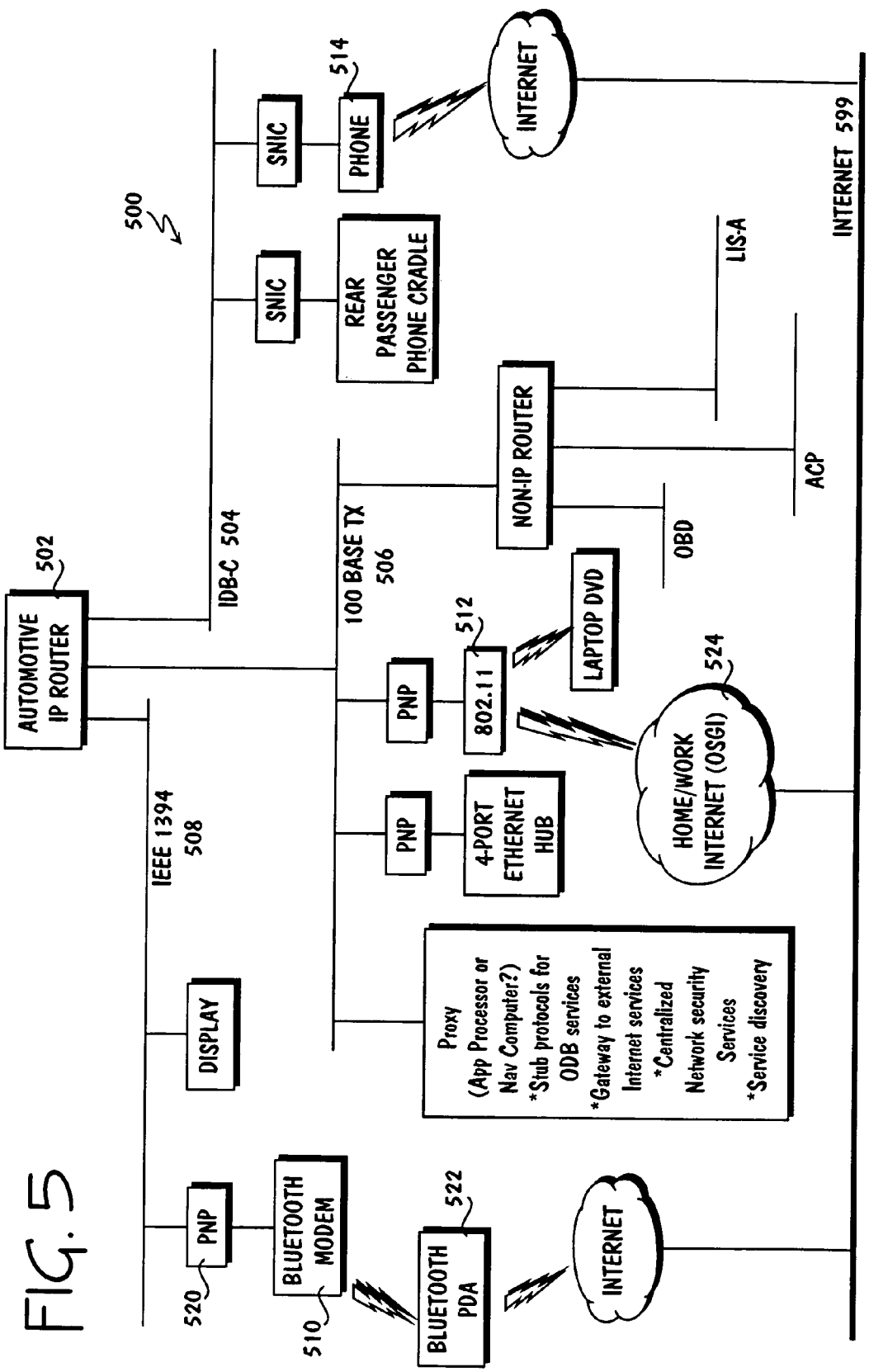
FIG. 5 is a vehicular network architecture of an embodiment showing both internal and external couplings.

FIG. 5 is a vehicular network architecture 500 of an embodiment showing both internal and external couplings. An automotive Internet Protocol (IP) router 502 is resident on the gateway, which serves to couple, for example, an IDB-C bus 504, 100 Base TX Ethernet 506, and an IEEE 1394 bus 508. Supported couplings to the Internet 599 include, but are not limited to, a Bluetooth modem 510, an IEEE 802.11 radio 512, and a mobile telephone 514. The Bluetooth 510 modem can couple through a public network port (PNP) 520 to the IEEE 1394 bus 508, and in turn communicate with a personal digital assistant (PDA) 522 equipped with a Bluetooth radio. The latter may then couple to the Internet 599 through a service provider that specializes in low-rate communications, e.g., at the level of two-way paging.

The IEEE 802.11 radio 512 of an embodiment is coupled to the Ethernet network 506 to support communication with home or workplace networks 524 according to open services gateway initiative (OSGi) standards, which then have wired or wireless couplings to the Internet. A coupling that uses a mobile telephone coupled to the IDB-C bus 504 can support an Internet coupling through a mobile telephone network.

The WINS vehicle internetwork of an embodiment includes functionality that enables convenient and secure coupling of diverse networks and devices. Consequently, each of the buses within the vehicle internetwork can support subnetworks. For example, a non-IP router supports an Ethernet or other coupling with on-board diagnostic (OBD), Audio Control Protocol (ACP), and LISA audio networks.

Software for managing the service discovery, device authentication, and other security features resides within the gateway or some other host such as a navigation computer. This software, or proxy, is coupled to the 100 Base TX Ethernet bus in an embodiment, but is not so limited. In alternate embodiments, the IP router, proxy, and non-IP router can be embedded within the gateway. Thus, through use of proxies and ports, such gateway functions can either be centralized or distributed within the network, while enabling secure network operation.

Figure 6:
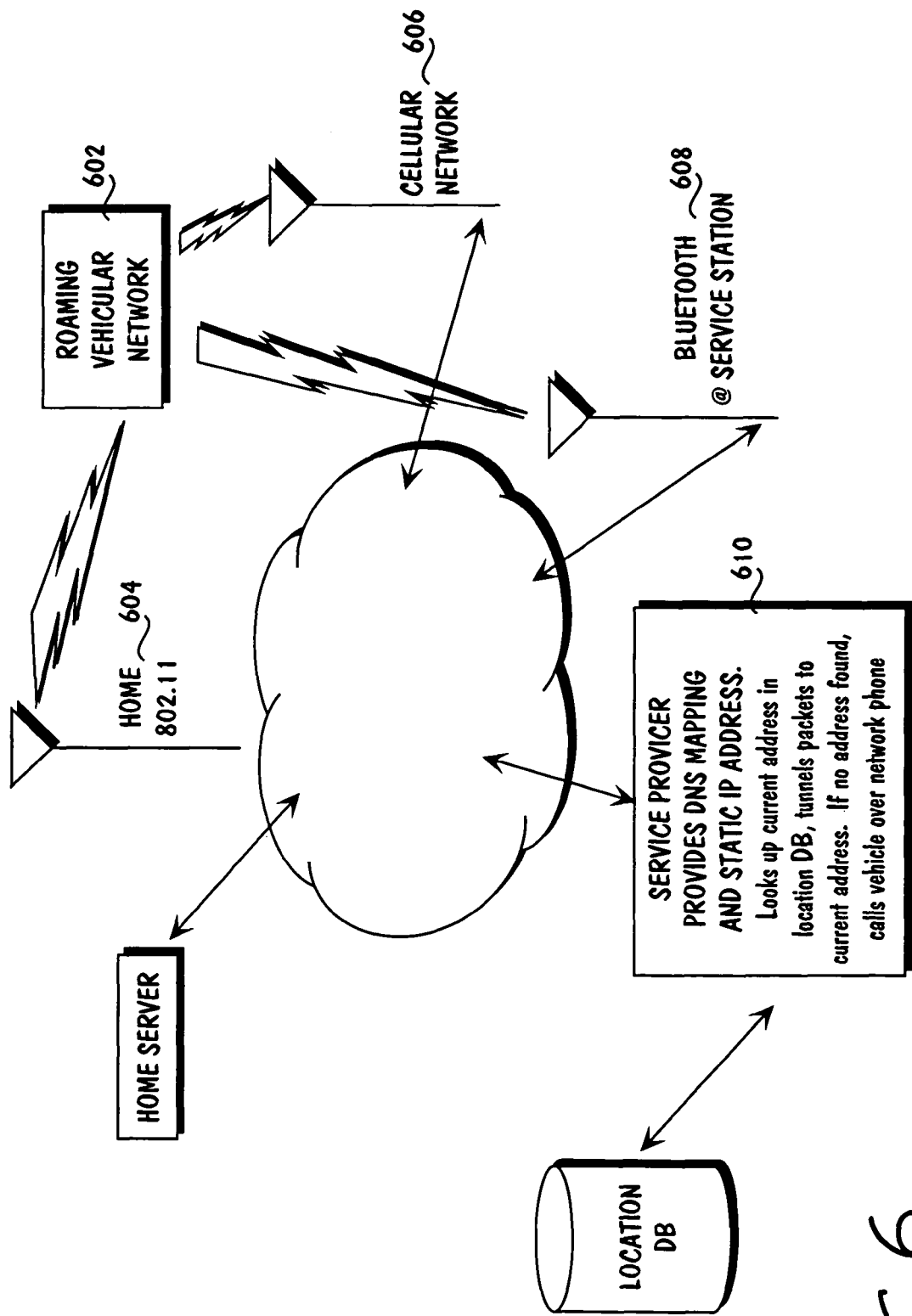
FIG. 6 shows Mobile Internet Protocol (IP) (Mobile IP) connectivity using the WINS vehicle internetwork of an embodiment.

FIG. 6 shows Mobile Internet Protocol (IP) (Mobile IP) connectivity using the WINS vehicle internetwork of an embodiment. The roaming vehicular network 602 can communicate using an 802.11 radio, a cellular radio, or a Bluetooth radio, but is not so limited. Communication using the 802.11 radio is via a port to a home network 604. Communication using the cellular radio is via a cellular network 606. Communication using the Bluetooth radio is via a service station 608. Each of these external entities are coupled to the Internet through networks including wired networks, wireless networks, and hybrid wired and wireless networks.

In operation, the vehicular network 602 tries to select the most cost-effective communication alternative that provides the desired level of service, but this can be problematic in that some alternatives only exist in certain places (e.g., home, or service station). Further, most alternatives will provide the automotive network with a different external address. The WINS vehicle internetwork solves this problem by having an internet service provider (ISP) assign a static IP address to the vehicle and a domain name server (DNS) mapping 610. For example, the ISP may look up the address in the location database (DB). Packets destined for the vehicle are sent to that static address. When the ISP receives a packet for the vehicle, it first checks its database to locate any potential addresses for the vehicle. The ISP tries to find a working address by pinging; if a working address is found, the ISP tunnels the packet to that address. Otherwise, the ISP uses the vehicle's cellular phone number to attempt to establish a coupling over the telephone network, and tunnel the packet through. While the cell phone network has the broadest geographic extent, it also has a higher associated cost, and thus the reason for attempting other means of communication. Potentially, any number of available methods of communication can be attempted.

Using network technologies that provide inexpensive short message service (e.g., two-way paging), the vehicle can periodically advertise its favored means of contact (i.e., cheapest and best method). Because of the costs of cellular telephony, there may need to be constraints on the use of the cellular phone connection. In some cases, the owner of the vehicle may want to be offline except when he specifically wants to dial out. Those skilled in the art will realize that there are numerous optimizations of mobile IP that are discussed in the networking research literature, for example, means intended to short-circuit the tunnel by sending directly to the vehicle's current address. The claimed invention is intended to encompass all such embodiments.

Security
Proxy and Port Architecture

The large number of ways information can enter the vehicle internetwork, and the varied costs associated with the different external communication modes, result in security issues including denial of service attacks, snooping and replay attacks, and unauthorized access. There can be both deliberate and unintentional denial of service attacks, in which the network or particular servers are flooded with data. This consumes scarce network resources and may even impair essential operations of the vehicle. Unintentional attacks are caused for example by malfunctioning devices, or devices which were not designed to operate within the vehicle network.

Snooping and replay attacks are also of concern. An eavesdropper may see and replay confidential data such as passwords and control traffic related to vehicle security (e.g., doorlocks) to gain access to the vehicle system. Information can also be gleaned from apparently public data, in the form of traffic analysis, so that usage patterns for services can be discovered or other information the consumer may wish to protect is compromised. There may also be attacks on personal privacy, for example, where control of a Bluetooth web camera or hands-free microphone system is seized.

Unauthorized access is also problematic. Access to applications can reduce utility for the intended users, and personal data can be compromised. Additionally, it is desirable to limit access to networking and routing resources only according to specified levels, as some of these resources may be in high demand (e.g., the IDB-C bus) while others may result in large connection charges (e.g., the cell phone).

While the standard interfaces associated with the AMI-C bus provide for ease of integration of diverse devices into the network, they have an associated risk that unauthorized devices may be added to the network which then issue commands that damage the operation of the network or vehicle. Thus, security measures are provided in an embodiment that: enable only authorized devices to be added; and, accept only certain commands from particular classes of devices. These security measures are provided in an embodiment without the need for significant modification of the integrated device in order to prevent the manufacturers of integrated products from incurring unnecessary expense. Instead, this burden largely falls upon the gateway, the port nodes, and an easy to use interface provided to the vehicle operator. As an example, while there is now a standard ISO/CD 15764 for authenticating devices to go into automobiles, the registration process is both costly and time-consuming, thereby placing great demand on consumers.

A security architecture of an embodiment implements security functions both at ports to the network (e.g., different varieties of port nodes such as PNPs, and serial network interface connectors) and internally in a proxy that is hosted in the gateway or in some other host like the navigation computer or auto personal computer (PC). These can be regarded as complementary approaches to security, corresponding respectively to security at the access points to the network and internal security. While in principle for entirely new networks it may be possible to have all security functions embedded in the ports (e.g., homogeneous WINS NG networks), in practice vehicular networks will include many legacy applications with insecure protocols, and a second layer of security may be used to have the necessary degree of protection. At the same time, relying solely on internal security techniques makes it essentially impossible to resist denial of service of attacks due to malfunctioning devices; it is necessary in such cases to be able to physically shut off access.

A denial of service attack is handled in the network of an embodiment by having the network turn off an untrusted port at the connector, and block specific applications at the connector that have not been authorized. Consequently, the port in collaboration with the proxy acts to quickly end such attacks. By blocking unauthorized applications at the connector, the gateway does not require the ability to filter commands passing from one internal network to another, while it may exercise an ability to perform network intrusion detection.

Snooping and traffic analysis can be dealt with using techniques such as confounder codes and encryption that can be employed in applications that, in providing security, assume the bus is insecure. However, a number of legacy applications may use insecure protocols, and device resource constraints may make security too expensive. The network of an embodiment reduces connector promiscuity by permitting only trusted devices such as the connectors described herein to directly couple to the bus. These devices in turn act as bridges or switches, copying traffic only for the client, rather than exposing the client to all bus traffic. By this means, the chances of eavesdropping can be greatly diminished. It is thus not necessary in such instances for all data to and from the public Internet to be encrypted, since the application will determine the need. The proxy serves as the single point of control for access to the external Internet, thus limiting access to only those users who are authorized. Access to internal services is similarly defined by a security policy, with the proxy or other devices authorized by the proxy serving to control access. For legacy controls that cannot support secure interfaces, proxy stubs are employed. Additionally, legacy applications may be filtered at the connectors to internal and external networks to ensure data privacy and resist traffic analysis attacks.

Figure 7:
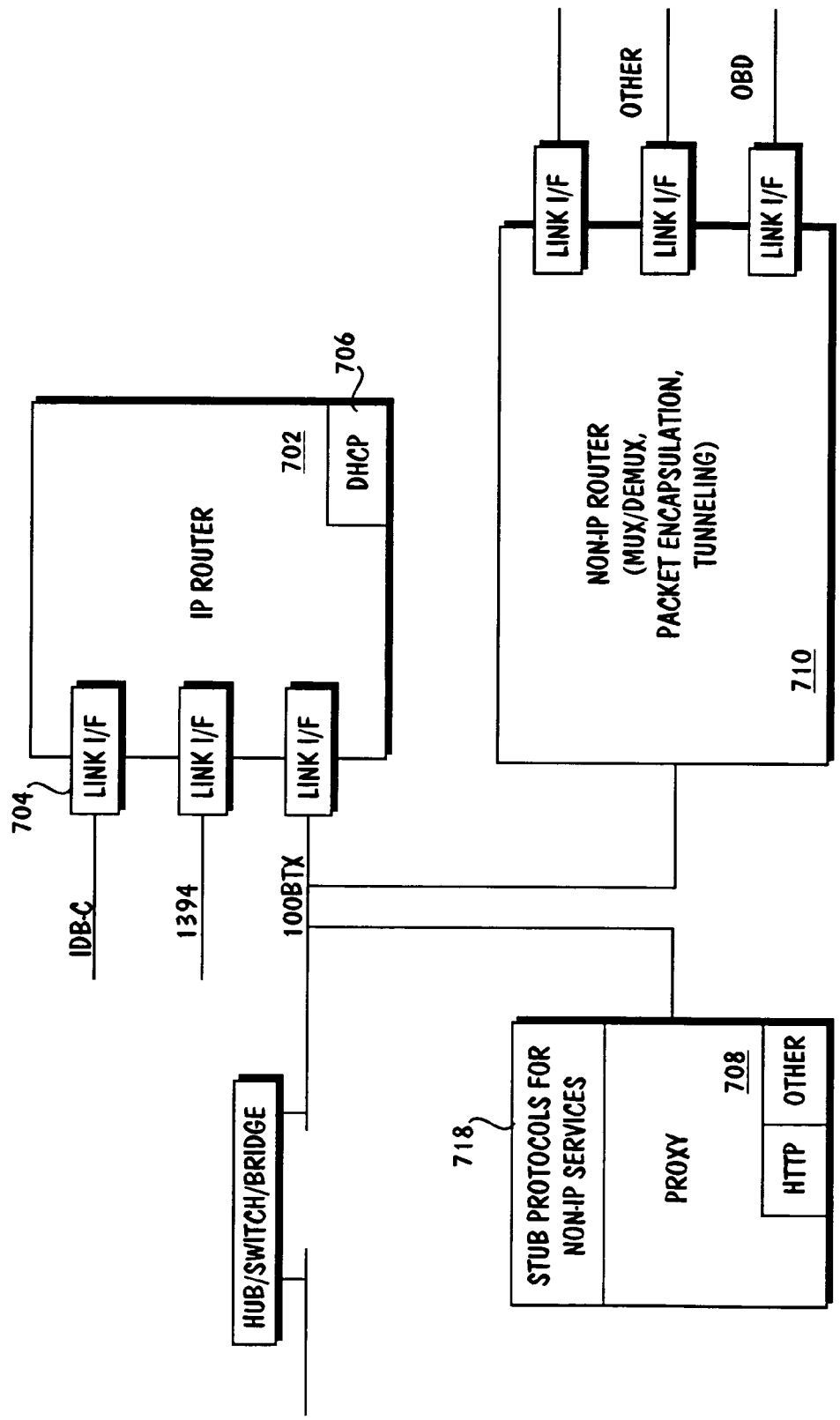
FIG. 7 shows the gateway functions of an embodiment linked or distributed using Internet Protocol (IP) techniques.

FIG. 7 shows the gateway functions of an embodiment linked or distributed using Internet Protocol (IP) techniques. The network uses IP to enable continued use of legacy systems, provide security, and provide flexibility of implementation, but is not so limited. The IP router 702 routes between IP networks that run a variety of link and physical layers. Link interfaces 704 implement the link and physical layers. Internet Protocol packets from the router are encapsulated in link layer packets with the appropriate destination addresses, resolved by ARP (Address Resolution Protocol). The link interfaces 704 have input and output buffers. Routing is performed based on the incoming interface and the destination IP address of an incoming packet, by selecting an outgoing interface for each packet.

On bootup, the router 702 detects the networks that attach to it and assigns addresses to them. Nodes on those networks get their addresses via the dynamic host configuration protocol (DHCP) 706. For this purpose, the router 702 provides a minimal DHCP service to supply host and gateway addresses, and the address of the "proxy" 708. The proxy 708 is a device that centrally manages the network and is responsible for security. It may be resident on the gateway node itself, in some other device, or its functions may be distributed over several devices. The proxy 708 uses a secure tunneling protocol to authenticate itself to the routers and to control their behavior, but is not so limited. For example, the proxy 708 might instantiate firewall rules on the IP router 702.

The router 702 may not know the address of the proxy 708 until it establishes a secure coupling to the proxy 708 on bootup. Devices that need the proxy address, but do not initially receive it, will need to try again after a timeout. The major benefit of using a proxy 708 is that it simplifies the router 702 by handling most configuration. However, for certain operations that demand low latency, the proxy 708 may upload additional data into a DHCP store on the router.

Some networks may not support LP because of resource constraints and legacy or proprietary hardware. These networks link into a non-IP router 710. The non-EP router 710 extracts the raw data from packets into an intermediate format and multiplexes them into a single data stream. This data stream is securely tunneled to the proxy 708 (i.e., encapsulated within a secure IP packet). Return traffic from the proxy 708 is demultiplexed and exported onto the appropriate busses using their native link layer protocols. This device has a known address on one of the networks serviced by the IP router 702. The stub protocols in the proxy 708 take on the task of making these non-IP capable devices appear to be IP devices to the rest of the network, so that this larger network can employ IP-based protocols and routers. In this way, security features and the like are added for the longer-range transport of messages from legacy devices or subnetworks, without imposing impractical burdens on these networks or devices.

The proxy 708 acts as a central point for managing security and acts as a proxy for all traffic to and from the Internet. It supports a preloaded set of protocols, but additional protocols can be uploaded. It also manages vehicle internetwork connectivity, and controls what devices are allowed to access the public Internet. The proxy 708 can be implemented on any sufficiently powerful CPU and can reside anywhere on the network. It establishes secure control channels via encrypted tunnels to the IP router 702 and to the non-IP router 710. It provides stub interfaces 718 (possibly through virtual IP addresses) for services accessible via the non-IP router 710 and associated busses. The routers 702 and 710 and the proxy 708 of an embodiment share authentication tokens to ensure that the correct proxy is talking to the vehicle on boot-up, because many of the security functions of the network are controlled by the proxy 708, and the embodiment is not so limited.

The WINS vehicle internetwork provides a system in which non-secure messages only propagate within the legacy networks. All messages passed to and from the non-IP router 710 and the proxy 708 use secure IP connections and thus, the scope for eavesdropping is sharply limited. Further, all other communications within the network can be supported with secure IP, thereby providing the advantages of leveraging broadly available software, and a reduction of protocol translations when interfacing with the broader Internet. Finally, it enables distribution of gateway functions, so that the IP router 702, proxy 708, and non-IP router 710 do not need to be resident in the same physical device.

The proxy of an embodiment can be distributed. For example, the provision of IP and application level interfaces to services on non-IP networks can be located at the non-IP router. This avoids loading network couplings with proxy-specific traffic. Other functions such as acting as the border gateway to a wide area network (WAN) can be centralized at the gateway or distributed as required.

Centralization has a number of advantages including, but not limited to: providing one place to perform security; hiding the decision about which WAN to use behind a single logical gateway; and routing decisions never change as a result of changes in WAN connectivity. Further, if the traffic between the non-IP router and the proxy is tunneled over its own wire, network burdens can be eliminated for this function. Most conveniently, if the gateway itself includes the non-IP router as one of its ports, centralization of functions is easily accomplished. In other embodiments, all proxy functions may be centralized in one location in the initial installation of a system, but as further elements are added to the network, some of the functions can migrate to other hosts, e.g., additional non-IP routers, or supplemental processors. This results in a lower cost when upgrading the vehicle internetwork.

Other security and translation functions are accomplished through the port nodes, or the network connectors, of an embodiment. A vehicle internetwork can include a variety of port nodes, including non-IP routers, SNICs and PNPs. The port nodes of an embodiment include, but are not limited to, a Serial Network Interface Connector (SNIC) and a Public Network Port (PNP). Both the SNIC and the PNP interact with the proxy to enable IP to be employed over a large variety of buses.

Figure 8:
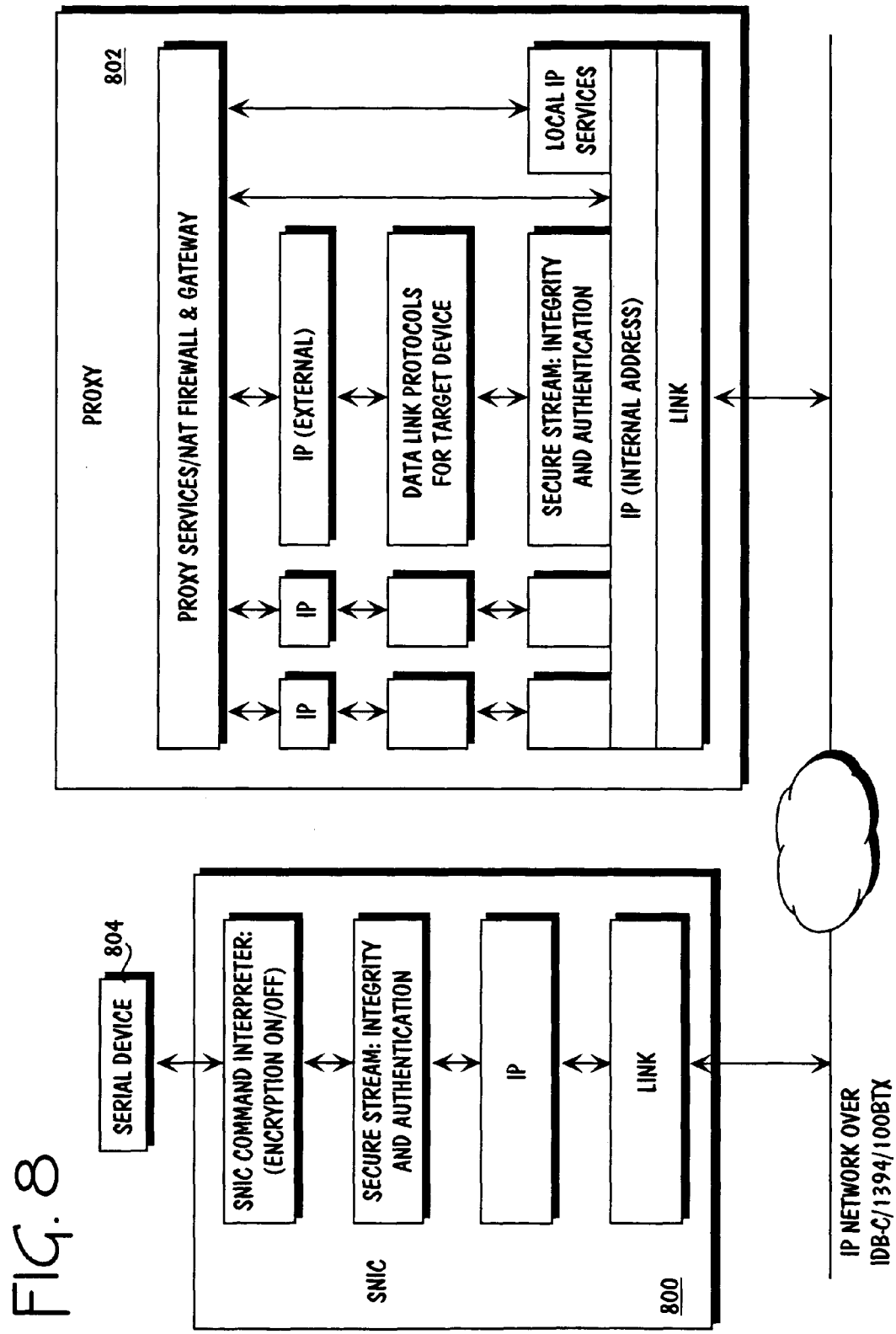
FIG. 8 is a Serial Network Interface Connector (SNIC) and an associated internal proxy structure of an embodiment.

FIG. 8 is a Serial Network Interface Connector (SNIC) 800 and an associated internal proxy structure 802 of an embodiment. As an example of device interaction, a cell phone or serial device 804 is coupled via a SNIC 800. The cell phone implements some serial protocol, which the SNIC 800 does not interpret. The serial data is sent back to the proxy 802 which implements a protocol stack to operate the serial link to the phone as well as higher level link protocols such as PPP. Once an IP-capable coupling is established, a new interface is created at the proxy 802 that has an external Internet IP address. Depending on the configuration of the proxy 802, traffic is sent to this address using application level proxies or a network address translator (NAT). Several couplings can be established simultaneously or on-demand, and the optimal coupling can be selected based on factors that include cost per bit and data rate.

The tunnel from the SNIC 800 to the proxy 802 is secure in an embodiment. This security uses reliable transport and cryptographic checksums to accomplish authentication and a guarantee of integrity. For example, this protects against devices that capture and replace packets, for example, to obtain free phone access. In the case of data that is being routed to the Internet, no further security is required. However, certain portions of the serial protocols may need a higher degree of security; for example, traffic from authentication protocols, either to the phone or to the ISP, may include cleartext passwords and other vulnerable data which should be encrypted. The SNIC stream protocol of an embodiment therefore includes an escaping mechanism that enables control messages between the proxy and the SNIC to be inserted into the data stream. One of these commands turns on encryption while another command turns off encryption. The encryption is performed on the data stream and does not affect the escaping mechanism. Another command can be used to inform the proxy when the phone is removed or replaced in the connector cradle. The SNIC devices can establish a coupling to the proxy on bootup, whether or not a phone is in the cradle.

The proxy 802 of an embodiment can implement arbitrary security policies governing external connections. For example, there can be stored authentication data for a driver's telephone, but such data might not exist for passenger telephones. Security and resource management policies can govern the conditions under which an external Internet coupling is established. This architecture reduces the cost and size of the SNICs, since they are not required to interpret all commands of the devices to which they couple. The proxy 802 takes on the higher-level functions that are difficult to implement or of a transient nature compared to the lifetime of the vehicle. The proxy 802 also can accept software upgrades or even convenient hardware upgrades, as it can reside anywhere on the network. Further, reliable streams are established from the boundaries of the network to the proxy 802, with the SNIC 800 capable of being controlled to shut off communications from misbehaving or unauthorized devices.

Figure 9:
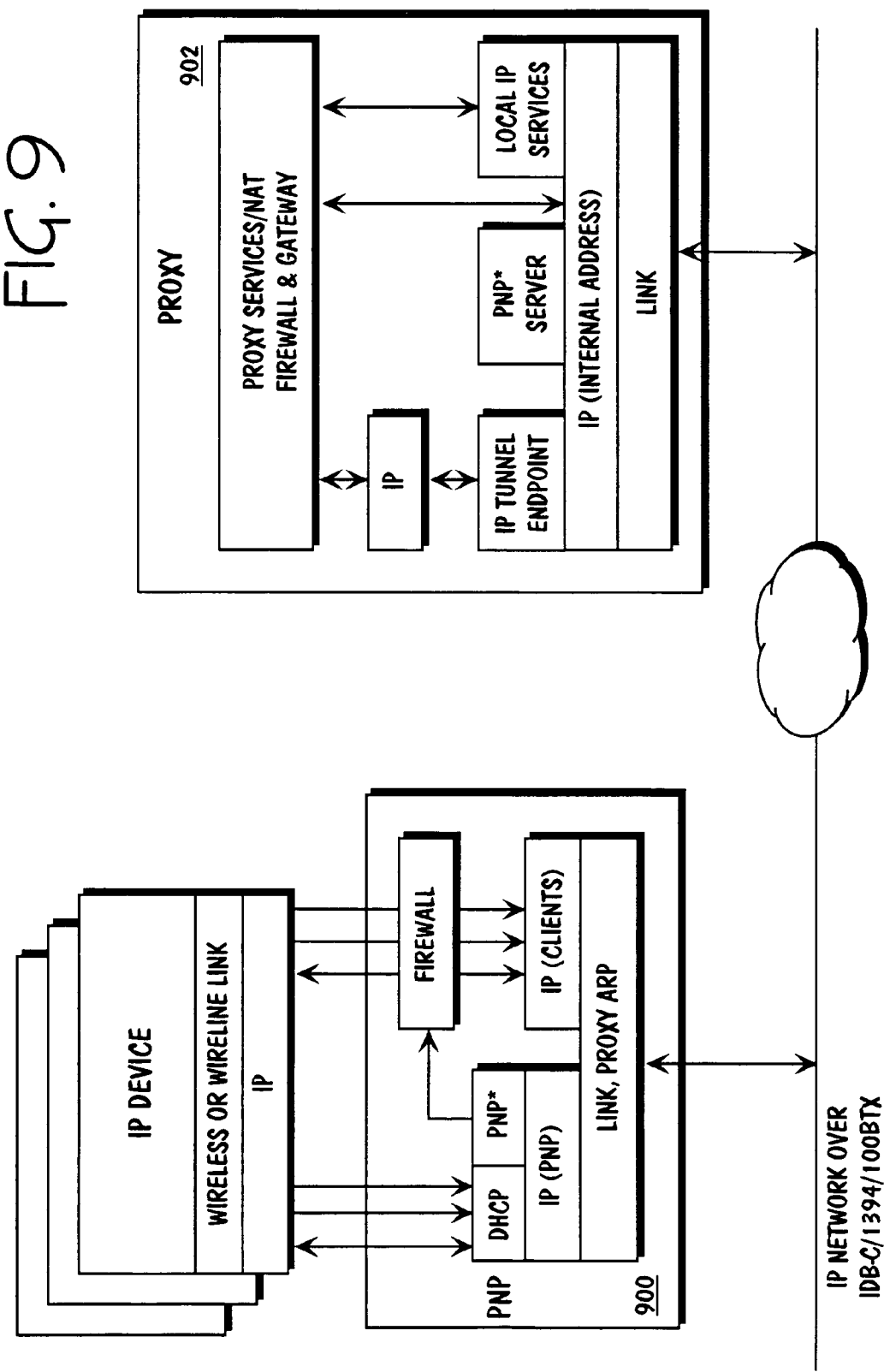
FIG. 9 is a Public Network Port (PNP) and an associated internal proxy structure of an embodiment.

FIG. 9 is a Public Network Port (PNP) 900 and an associated internal proxy structure 902 of an embodiment. The PNPs 900 of an embodiment are distinguished from the SNICs in that the device or network they couple to is IP-capable. Consequently, different functions are provided.

The Public Network Port (PNP) 900 is a port node to which any wireless or wireline device may safely couple. It exports a DHCP service which either assigns local IP addresses from a block of local addresses or proxies the DHCP request onto its network. New devices couple to the port 900 and use DHCP to acquire a local address and the address of the "proxy" 902. Initially, the firewall is configured to block all traffic from a new address that is not directed to the PNP port of the proxy address. Disconnection of a device from the port 900 is monitored, so that the proxy 902 can be informed and all security permissions for that address may be revoked.

A device may negotiate with the service at the PNP port 900 to extend its privileges. Privileges are associated with specific local IP addresses. This negotiation can make use of an arbitrarily complex security policy. Authentication can be done using any technique available to both the client and the server (software upgradeable on the server). For example, non-authenticated users might be permitted a certain amount of bandwidth on an external Internet coupling, but might not be permitted to cause an on-demand link to be established. Only certain addresses might be permitted to establish such a coupling.

The PNP 900 of an embodiment accommodates different combinations of firewall complexity and the associated efficiency. A firewall with a lower level of complexity lets the proxy 902 make all the decisions and, thus, allows couplings to safe ports on the proxy 902. More complex firewalls allow mobile devices to communicate directly with certain services on the internal network. Design trades are also accommodated with the client-side software. Not all clients will have the appropriate software to perform authentication. On the server side this is managed by implementing various popular authentication protocols. Further, another approach expands the default privileges to include the most typical and innocuous applications, such as low-bandwidth web traffic to public internal services and free external Internet services. This is implemented by changing the default rule set in the firewall, but is not so limited.

External network connectivity can also be available from a wireless gateway that connects via a PNP 900. After negotiation at the PNP server, an IP tunnel is established to the proxy 902 that can be used as an external Internet coupling. The PNP server can also link internal networks that are IP capable. In this case, the proxy ARP causes the multiple devices to appear as one link layer address for the rest of the bus coupled on the other side of the PNP 900. Devices on the internal network can in turn be addressed using a number of techniques. The security methods used for devices connected to the bus, however, also extend to the devices that are coupled to the internal network.

In common with the proxy/SNIC interaction, the PNP/proxy combination enables device authentication, restrictions to bus access, and secure IP communications over the bus. While the PNP 900 need not host all services required by the IP device, it may pass on much of the burden to the proxy so as to provide a cost and size reduction.

Supplemental Physical Security Measures

The proxy/port architecture of an embodiment flexibly supports a variety of supplemental physical means for ensuring network security. For example, the WINS vehicle internetwork supports the fact that the vehicle already includes a security system, namely, an ignition key. Sensors within the network detect if the electrical system of the car is enabled by determining a position of the ignition key, for example, either turning the key all the way or to a position that activates the electrical system. The system accepts the addition of devices to the vehicle network when this activity is detected.

Furthermore, the network can comprise a device that accepts the input of a short password (e.g., a PIN having a prespecified number of digits) for a higher level of security. This device can be wired into the network or be a wireless pad to which security authorization for this operation has previously been given. At this point, the ports on the network will now accept devices being attached, with the identification number of the device being read and added to the library of authorized devices. Further, this security includes devices seeking to couple via the wireless ports. With this method, the devices being connected to the network do not require any built-in security features as the security burden is assumed by the proxy and ports.

Higher levels of security are also supported by the wireless ports of an embodiment. For example, it is possible that someone standing near the host vehicle when the ignition key is inserted and the PIN entered may have a device with AMI-C bus connection capability. This device could be a wireless device that is not intended to be authorized for attachment to the network. In this case, a security display alerts the vehicle operator in a sequential fashion of all the devices that are not presently registered in the vehicle security database that are attempting to attach. If the description does not match the device the operator was attempting to attach, the operator can decline the connection.

Physical security is also provided in an embodiment using a designated authorization port. The designated authorization port is a port to which connectors are first coupled in order to be authorized for coupling a device to the network. The port is activated by some combination of ignition key detection or PIN entry, but is not so limited. Codes are exchanged which subsequently allow the connector to be used in any matching socket in the vehicle within some specified time window. The connector accepts only one device being attached to it, at the option of the operator, or any device that physically attaches to it. In the latter case, the operator can retain the option of explicitly authorizing the device via a security panel. This method is particularly convenient for enabling installation of consumer electronics, so that the vehicle owner need not be with the vehicle at the time of installation.

In providing security, authenticated devices operating in an embodiment provide an additional level of security to the network and attached devices by including a policy in their protocol that prevents them from forwarding messages to non-authenticated devices. This prevents an authenticated device from receiving messages from non-authenticated devices and passing these messages on through the network. Further, this avoids denial of service attacks, thereby releasing the port or proxy from having to screen the content of all messages.

The gateway along with the associated proxy functions provides further security in that it provides a firewall between the AMI-C bus or other consumer networks and the OEM bus. With this firewall, even if an unauthorized device is attached it cannot disrupt the essential functions of the vehicle. The gateway manages the library of authorized devices and the distribution of public keys used in secure communications. Further convenience and security can be obtained if only manufacturer-approved devices can be added to the OEM bus. This need not require explicit authorization by the vehicle operator if the device to be attached includes the appropriate identification code for the vehicle. The gateway can maintain a library of approved device identifiers for addition to the bus, which is periodically updated through a secure communications session with the manufacturer's service network.

Security Scenarios

The proxy/port architecture of an embodiment resists common vehicular security attacks in many ways. For example, consider an attempt to spy on the bus traffic to replay the door lock command, or in general unauthorized issue of a door lock command. Because secure IP communications take place everywhere within the network, an eavesdropper would need to physically attach to the OBD bus, which is connected to the non-IP router. Thus, the eavesdropper would already had to have acquired physical access to a bus that is usually embedded within the body of the vehicle. This is considerably more difficult than simply breaking into the vehicle. Note that since the proxy exports the web interface, it can also broker the door lock button input according to a security policy it maintains. Thus, external attempts are frustrated by policies similar to those used to secure web sites. Privacy is thus enhanced.

In another example of resisting common vehicular security attacks, a Bluetooth device launches a denial of service attack to the servers that control vehicle appliances, or attempts to broadcast video onto the Internet. In the first instance, excessive traffic from the device is detected, and the port is commanded to block further traffic. In the second instance, devices entering the network from an insecure port are explicitly given access to the Internet, for example by means of a pop-up display for the operator or voice authorization.

In yet another example of resisting common vehicular security attacks, consider a PDA being used for a remote banking transaction. In this case, reliance is placed upon the general design that applications assume insecure connections. Thus, the application-level security of the banking application is employed, with the vehicle enabling Internet access by acting as an HTTP proxy.

Secure software upgrades are also enabled in the WINS vehicle internetwork of an embodiment. For example, if the vehicle owner wishes to upgrade the software in the proxy, the proxy presently installed controls the addition of patches to security-critical services, and refuses patches that are not digitally signed by the manufacturer. If third party software is to be added (e.g., to proxy new protocols), then the owner authenticates the installation either in the same way that new devices are attached (if within the vehicle) or by means of passwords and other security procedures (if being effected remotely).

Gateway

Figure 10:
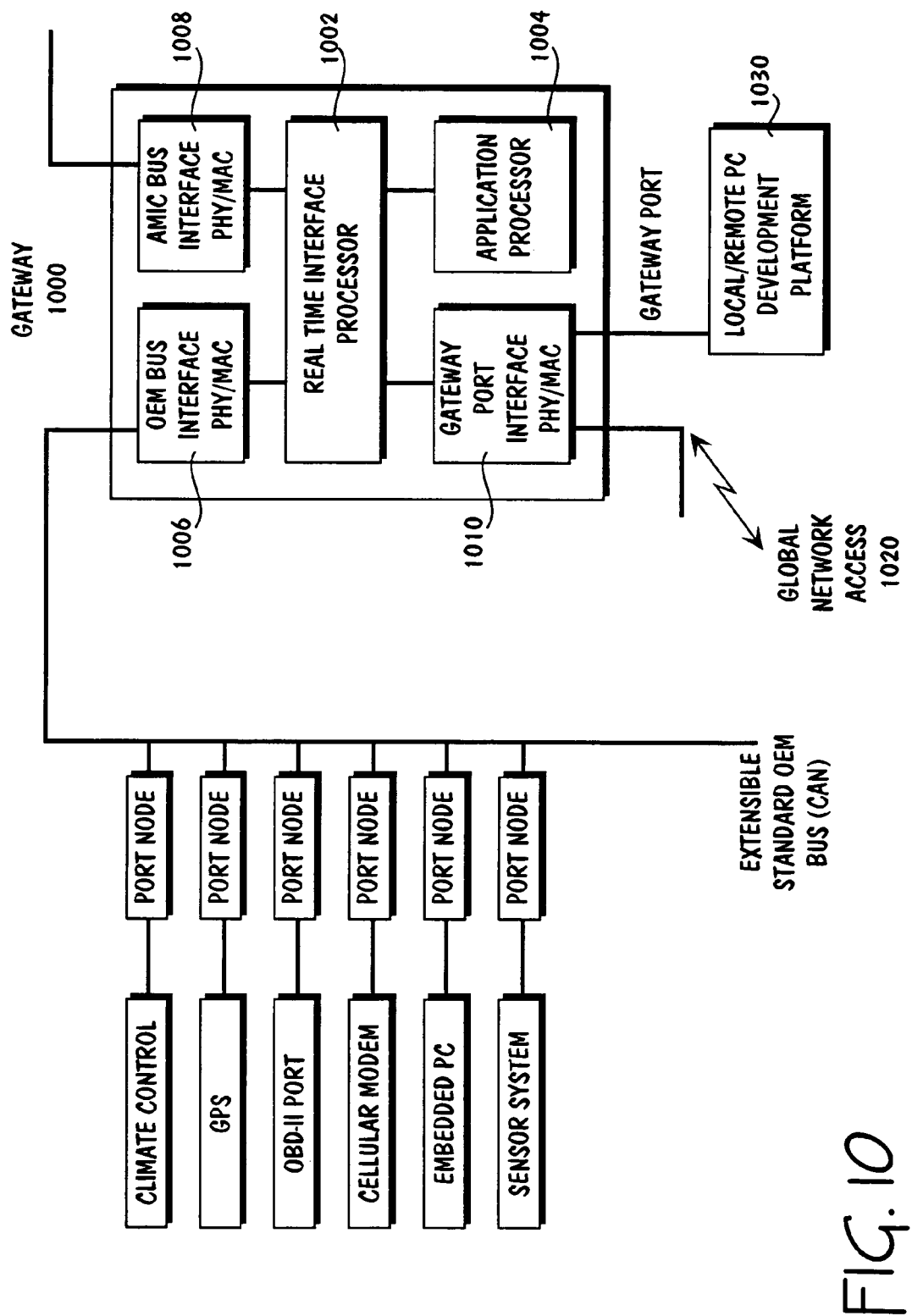
FIG. 10 is a WINS vehicle internetwork gateway of an embodiment.

FIG. 10 is a WINS vehicle internetwork gateway 1000 of an embodiment. The gateway 1000 provides a bridge between heterogeneous networks. For example, the gateway 1000 mediates between but is not limited to four different networks: the OEM bus, the AMI-C bus, an external network (Global network access via a radio port), and a local development network. The local development network includes simple networks comprising a single personal computer and more elaborate computer networks. The local development network can be used to allow developers access to the gateway to permit local upgrade, diagnostics and programming.

The bridge function includes both enabling messages to be passed from one network to another, and blocking messages where access is unauthorized. Thus, the gateway can provide a security firewall between two networks.

The local development network, or development port, can be configured to support the manipulation and transfer of entertainment software. The entertainment software comprises entertainment features including video, audio, movies, television shows, music, games, and simulations. The local development network coupling of an embodiment supports the high-speed wireless transfer of information among the vehicle internetwork and remote information stations, but is not so limited. Furthermore, the uploading of entertainment software is supported through peripheral devices and their couplings with the vehicle internetwork.

Further, the gateway 1000 may actually control access to one or several of the networks that it bridges, playing the role of the network master in master/slave networks. In this role the gateway 1000 can instruct misbehaving network elements to shut down, or allow access to particular functions (including being allowed to communicate at all) only according to particular security protocols. Finally, the gateway 1000 of an embodiment serves as the host for the proxy. Thus, the gateway hosts applications that require coordination of several devices on one or more of the networks coupled to the gateway, for example, interactive multimedia sessions or vehicle control functions involving several networks. In exercising this function the gateway 1000 can process the information packets to eliminate redundancy (similar to a data aggregation function) or to prevent inappropriate commands from being passed. As an example, in mediating access between sensors that produce data at some constant rate and a thin and expensive external bit pipe such as a cell-phone, the gateway 1000 can process the data so that only summary reports are passed on.

The gateway 1000 comprises, but is not limited to, the following components: a Real-Time Interface Processor (RTIP) 1002, at least one interface port 1006-1010, and an application processor 1004. The application processor 1004 can host parts or all of the proxy. The RTIP 1002 together with the interface components 1006-1010 represents a specialized preprocessor that omits sensing/actuation control functions, while the application processor 1004 handles higher level processing functions. The interface ports 1006-1010 include the physical and MAC layers for the network they interface to, for example the OEM 1006 and AMI-C 1008 buses, respectively, and a radio 1010 and the corresponding protocol, as well as a wired connection. The interface ports 1006-1010 also include buffers so that the various networks being bridged do not have to operate synchronously with respect to one another.

The interface ports 1006-1010 perform a protocol translation function, presenting the RTIP 1002 with data in a standard format for internal processing within the gateway 1000, for example so that it might function as an IP router. In this way, only binary protocol translations are used. This vastly reduces the complexity when N different ports are supported; only 2N translations are needed (N external to internal, N internal to external) versus $N^2-N$ possible translations. Moreover, internal operations are cleanly separated from any changes that may take place in the protocols for the various networks to be connected to a gateway 1000, enabling greater software and hardware stability.

The RTIP 1002 performs the processing to route packets to the appropriate destinations, and issues commands for control of networks for which the gateway 1000 is in the role of master. Thus, the RTIP 1002 performs both the functions of a switch and network master. The RTIP 1002 further routes communications to non-real time systems, such as the application processor 1004. The application processor 1004 can host applications associated with either the AMI-C or OEM buses, such as dealing with passenger conveniences or vehicle operations. These applications are upgradeable via input from the gateway port 1010, the global networks 1020 (e.g. via a web interface on the Internet), and a local development network 1030.

While the gateway of an embodiment includes the proxy, hosted on the application processor, and a non-IP router (the interface to the OEM network), many other configurations are possible. A network can include one or more gateways, and gateways can include a variable number of interface ports. These ports can be designed as modular components so that they may be re-used within other gateways and also within port nodes, leading to a lower-cost system. Thus, for example, a gateway can include some combination of ports for the IDB-C, MOST, Institute of Electrical and Electronics Engineers (IEEE) 1394, OBD-II, Standard Corporate Protocol (SCP), Audio Control Protocol (ACP), Bluetooth, Personal Communications Service (PCS)/Global System for Mobile Communications (GSM), Ethernet, and many other wired and wireless communication standards. Further, a gateway can include an interface port to another gateway, so that a larger number of couplings can be supported without overwhelming the RTIP.

Port Nodes

The WINS vehicle internetwork of an embodiment uses an interface for each device that is to attach to buses or other networks within a vehicle. For example, an interface is used between an AMI-C bus, such as the Intelligent Data Bus (IDB-C) or IEEE 1394, and consumer appliances that are supported by the bus. The port nodes perform this function. As part of the interface, the port node performs functions including, but not limited to, physical connection to the buses, physical connection to the consumer devices, protocol translation, and security. Although a port node is used for interface to AMI-C buses, the concept of an interface device has broader to implications for vehicle internetwork embodiments, namely, the non-IP router, SNIC and PNP devices.

The WINS vehicle internetwork supports interfaces with consumer electronics without a requirement for manufacturers of the consumer electronics to embed special connectors in the consumer electronic devices or to specially configure the devices for the vehicle network interface. In this way, legacy devices or devices designed for a broader consumer market can be added to the network so long as a port node which includes the necessary physical mating and protocol translation is available. Examples of devices that might be added include but are not limited to audio equipment including compact disk players and speakers, DVD players, video cassette recorders (VCRs), computers, and computer peripherals. Consumers are now used to buying special connectors for vehicle electrical outlets; port node adapters are the network connection analog.

As another example, a port node wireless adapter can include a radio that communicates to another port node coupled to the wired network. Thus, devices can be added without requiring physical connection. This both reduces the number of ports that are provided in any vehicle retrofit, and enables devices such as PDAs, cellular telephones, and computers to be conveniently added or removed from the network. Further, wireless port nodes can be designed with particular protocols (e.g., Bluetooth) that can directly network to consumer products. By this means, no modifications are required of the consumer products.

Similarly, port node adapters can interface a wired subnetwork to the AMI-C or OEM bus, for example the audio system. Also, protocol translation can be provided for any mixed wired or wireless network. Components and software for such adapters can be shared with interface ports for the gateway to reduce development effort.

Figure 11:
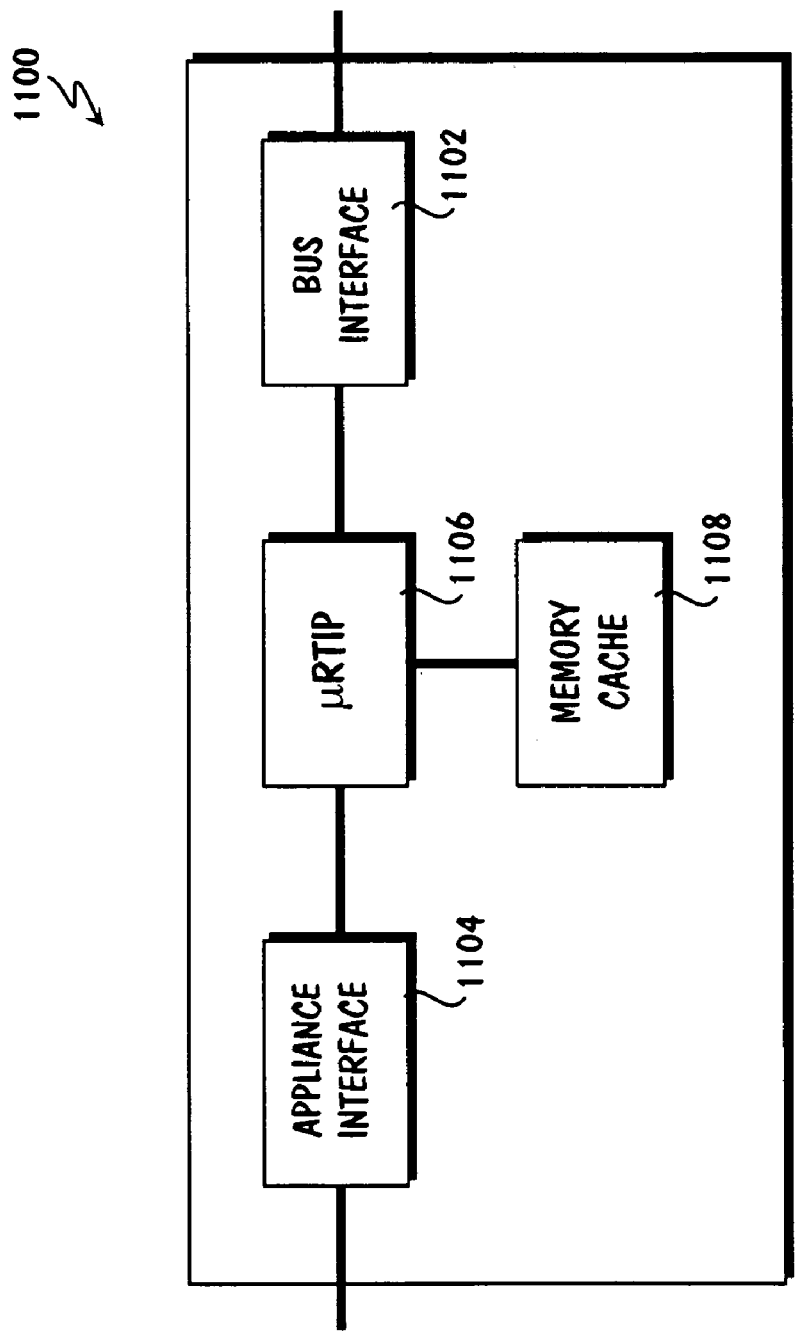
FIG. 11 is a port node architecture of an embodiment.

FIG. 11 is a port node architecture 1100 of an embodiment. The port node 1100 includes protocols for two different networks, with at least one of the appropriate line drivers, or radio modems, for each side. As an example, in bridging between an AMI-C bus, specified as IDB-C, and a Bluetooth radio network, the port node includes a bus interface 1102 that includes on the AMI-C bus side both the IDB-C protocol and associated line driver as well as a proprietary high speed driver that operates during assigned slots to communicate with like devices attached to the bus. Coupling the bus 1102 and appliance 1104 interfaces is a micro real-time interface processor (μRTIP) 1106. This device performs a subset of the functions that might be performed by the RTIP in the gateway, in that it is dealing with only one connection and is not controlling the networks on either side. Its functions include instructing the interfaces on the proper rates at which data can be transported, including the capability to block inappropriate transmissions across the device.

The port node 1100 further includes a memory cache 1108 for storage of policies that it may download from the gateway or other devices for support of services including security/authentication and prioritization of resource requests. The cache 1108 also has storage available for short-term queuing of information, for example, for the interval between slot availability on the two sides of the interface to allow the networks to operate asynchronously with respect to one another.

Figure 12:
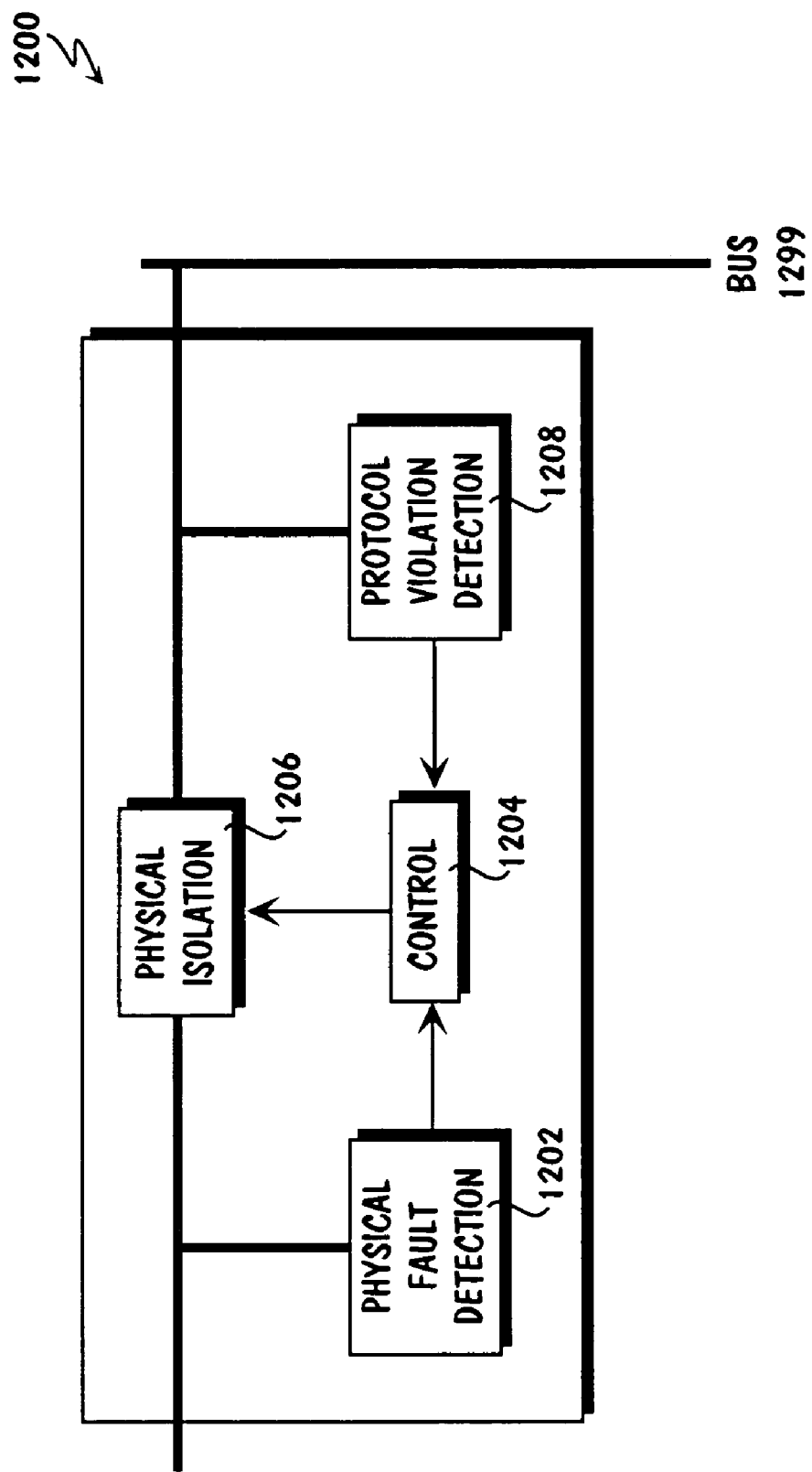
FIG. 12 is a safety connector of an embodiment.

FIG. 12 is a safety connector 1200 of an embodiment. The safety connector 1200 is provided in furtherance of passenger safety and the avoidance of consequences associated with malfunctioning devices flooding the bus 1299 with spurious data. As such, this safety connector 1200 avoids having to directly attach network devices to the terminals of a bus 1299. Thus, while port nodes can be used that directly attach to the bus 1299, for the passenger side of a network these can be supplemented by a simple connector that shields the bus 1299 and vehicle passengers from danger.

The safety connector 1200 includes circuitry 1202 for detecting a physical fault such as a short on the exterior side of the safety connector 1200, but is not so limited. This circuitry 1202 activates the control circuit 1204 to command physical isolation 1206 across the connector, e.g., by opening a switch. The protocol violation detector 1208 interprets commands from the gateway to isolate the two sides when necessary, as in response to a device that is flooding the network with access requests, or which is sending unauthorized messages. Additionally, the protocol violation detector 1208 includes circuitry to recognize that insistent use of the bus is being demanded by the device that is attached, so that it can command physical isolation.

Modular Vehicle Internetwork

The vehicle internetwork of an embodiment includes highly modularized components, wherein a distributed architecture is provided that allows for customization of components in support of diverse applications. The modularized components provide for reduced cost of individual system components, independent component engineering, and an API set that is independent of the hardware on which it resides.

Functions of the WINS NG system in an embodiment can be partitioned so that components are reusable among different product families. When partitioning components, the RTIP functions as a high-speed bus passing IP packets, with control residing at the devices with which it interfaces or couples. The gateway takes on the functions of an IP router, with additional functions related to security. Depending on the processors and ports to which the gateway is coupled, it serves as the core across a number of applications including, but not limited to, the sensor, diagnostic/prognostic, telematic, and AMI-C applications. Ports, depending on the interfaces used, can become tags, bridges, or network interfaces.

Figure 13:
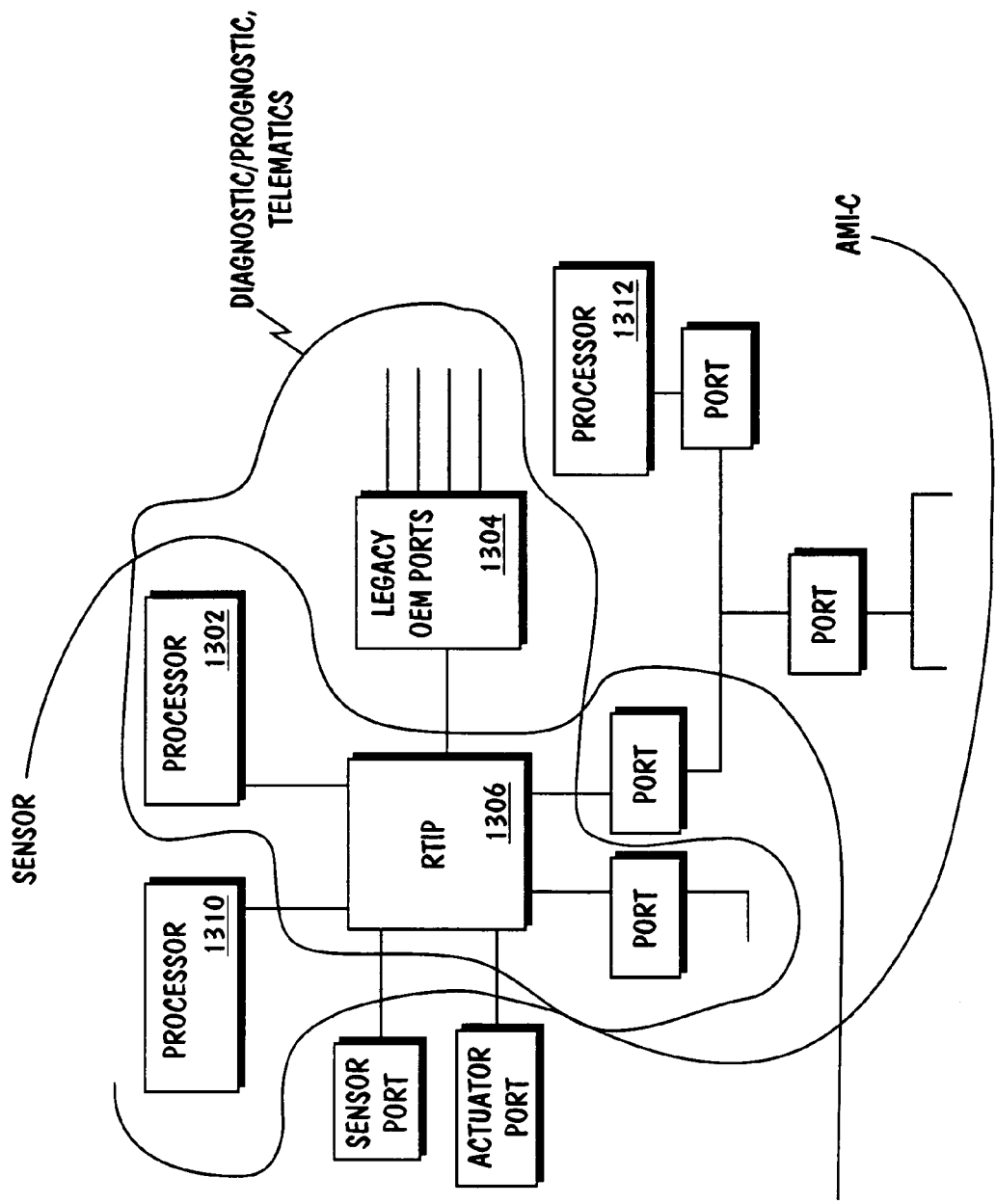
FIG. 13 shows a number of ways a WINS NG system of an embodiment can be reconfigured to accommodate different applications.

Regarding node architecture, FIG. 13 shows a number of ways a WINS NG system of an embodiment can be reconfigured to accommodate different applications. For telematic applications, the processor 1302 may be identified with a telematics processor. For diagnostic/prognostic applications, the processor 1302 can be configured as it would in sensor node applications. The legacy OEM port set 1304 aggregates information for more efficient use of the RTIP 1306, and avoids using a large number of its interfaces. For AMI-C applications, there can be to additional processors 1310 and 1312 coupled directly to the RTIP 1306 or coupled through the high speed network, or a combination of both as a result of upgrades over the life of the vehicle. For sensor applications, the automotive ports are replaced by sensor ports.

The WINS NG ports of an embodiment contain an interface that results in IP packets being passed through the RTIP, but are not so limited. As a result of scaling, shared resources such as memory and processing are not embedded within the RTIP itself; it is much more difficult to construct software that can deal with additional ports when there is frequent contention for a scarce common resource. However, to accommodate occasional demands for more memory, an embodiment includes extra memory and processing available through a particular port or ports, thus reducing the overall memory requirements compared to placing all such resources in the individual ports.

Likewise, security firewall operations are not directly performed by the RTIP of this embodiment. Instead, packets addressed to the OEM side are examined by a processor, and then forwarded, wherein the processor resides within the OEM port, or elsewhere. For example, a security processor can issue tokens which then allow such devices to directly communicate to some other location. While not precluding the first RTIP from being a processor that integrates switch and port functions, however, the use of standard interfaces provides modularity.

The modular switch architecture of an embodiment includes a hybrid architecture that enables the switching fabric to be built up from a set of stand-alone modules, thereby enabling varying tradeoffs between total memory requirements and the speeds of the components. While some embodiments include relatively low-speed ports, some embodiments are capable of supporting high speed ports such as the IEEE 1394.

Figure 14:
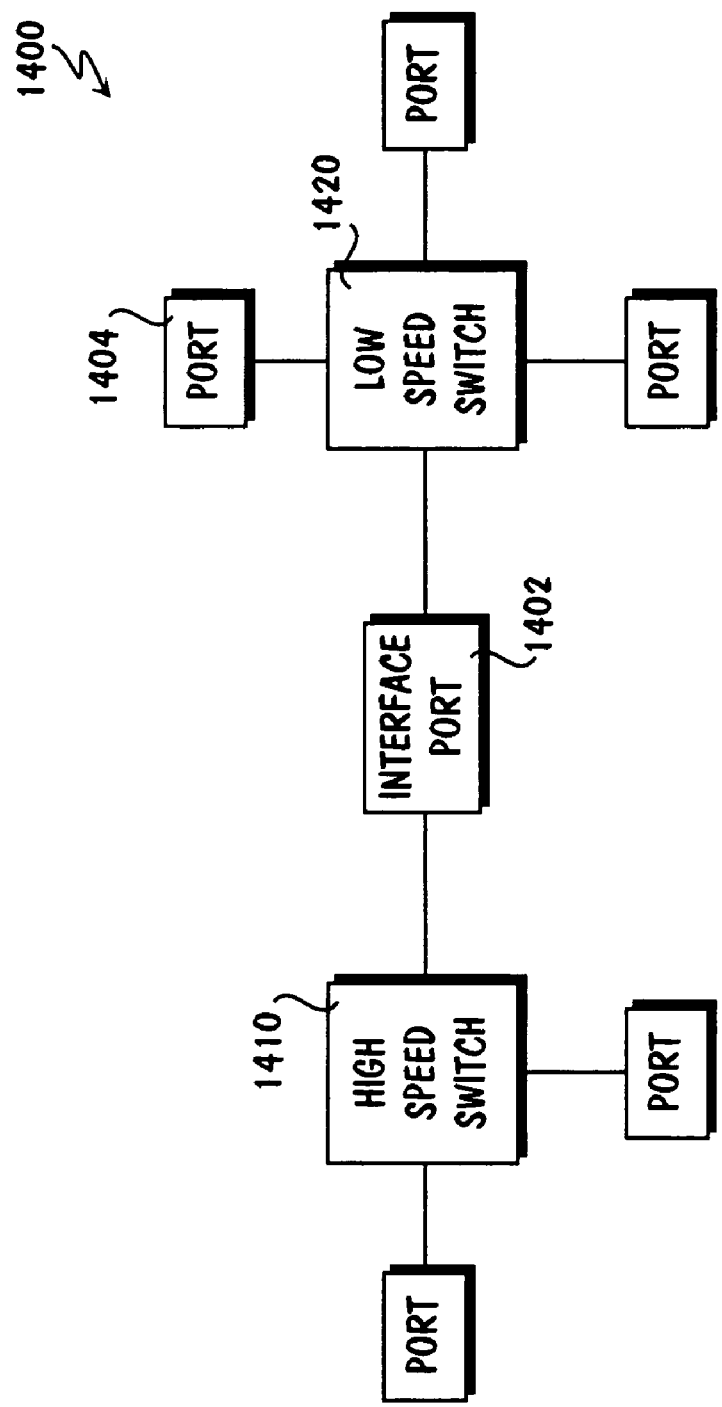
FIG. 14 depicts a hybrid switch architecture of an embodiment.

FIG. 14 depicts a hybrid switch architecture 1400 of an embodiment. The architecture 1400 includes at least one interface port 1402 coupled among at least one high speed switch 1410 and at least one low speed switch 1420 or lower speed switch. The high speed switch 1410 and the lower speed switch 1420 are each coupled to at least one port 1404.

As an example, the lower speed switch 1420 can be used in diagnostic/prognostic and telematic embodiments, while the medium/higher speed switches 1410 or modules are used with AMI-C products. This approach has the advantage of matching switch specifications to the demands of highly varied input ports. Thus, not every component must operate at the highest speed, and the appropriate switch architecture can be separately considered as higher performance ports are added to the system.

The modularity of the units also enables, for example, the coupling of multiple low speed switches to a medium speed switch. If internal packet formats and addressing conventions are the same, the interface port among the switches becomes very simple. Thus, in common with other WINS NG technology applications, processing and communications are matched to the resources demanded by an application.

The distributed switch architecture 1400 further supports distribution of the switching functions throughout the vehicle. Consequently, all of the buses and ports of the WINS vehicle system are part of the switching fabric. Therefore, an output buffer switch in effect distributes switching along the length of the corresponding bus. As a result, independent development and improvement of WINS vehicle switch components is supported throughout the life of the system.

A number of basic packet switch architectures can be used within the modular architecture of an embodiment. These typical switch architectures include, but are not limited to, distributed buffer architectures, shared buffer architectures, output buffer switch architectures, and input buffer switch architectures.

Limitations of particular architectures lead to the use of either the shared buffer architecture or the output buffer switch architecture, wherein advantage is taken of either a low part count (the shared buffer architecture) or use of standard high-speed buses such as an Ethernet or IEEE 1394 (the output buffer architecture).

Using a shared buffer architecture, a common pool of buffers is divided into linked lists indexed by the output port name. There are no crosspoints as such, with all routing based on these indices.

The output buffer switch architecture includes a multiplex buffer for each input (to match rates), a time-division bus which acts as the switch, and address filters and output buffers for each output. An advantage is found in the ease of programming in multicast.

In the diagnostic/prognostic and telematic applications, an interface is used between legacy OEM networks or ports and the processor. The shared buffer architecture is used in the interface, as transfers are relatively low speed. For each port, some number of inputs are buffered and then assembled into a packet; for convenience, all packets are of the same size and have the same addressing convention. They also get transmitted at the same speed. These then get passed through the shared buffer, which handles the queuing.

In an alternate embodiment, buffering is performed at the processor port (input buffering for downstream, output buffering for upstream), with the protocol conversion and rate matching taking place at each OEM port. The buffering includes input buffering for downstream transfers and output buffering for upstream transfers. Data is transferred to and from the processor port using either a bus (e.g., one for which there is already an interface written for the processor), or a tree structure.

In extending the architecture towards AMI-C, an additional output port can be included that enables the addition of a second switching stage. A buffer between the two stages performs rate conversion between the OEM switch and the higher speed switch. This buffer can be of the output buffer type, for example, eliminating one interface by having the switching bus as the highest rate component. Because there are few high-speed buses in the vehicle, the additional parts count compared to a shared buffer architecture would be slight, given the more substantial multiplexing/rate conversion effort required for high-speed buses.

In an alternate embodiment, a medium speed switch and associated buffers are coupled among the high speed switch and other switches or ports. The medium speed switch can use either the shared buffer or output buffer architecture. This provides great flexibility and supports independent component design as the interface between the stages converts the internal packet format/address convention of the succeeding stage.

Figure 15:
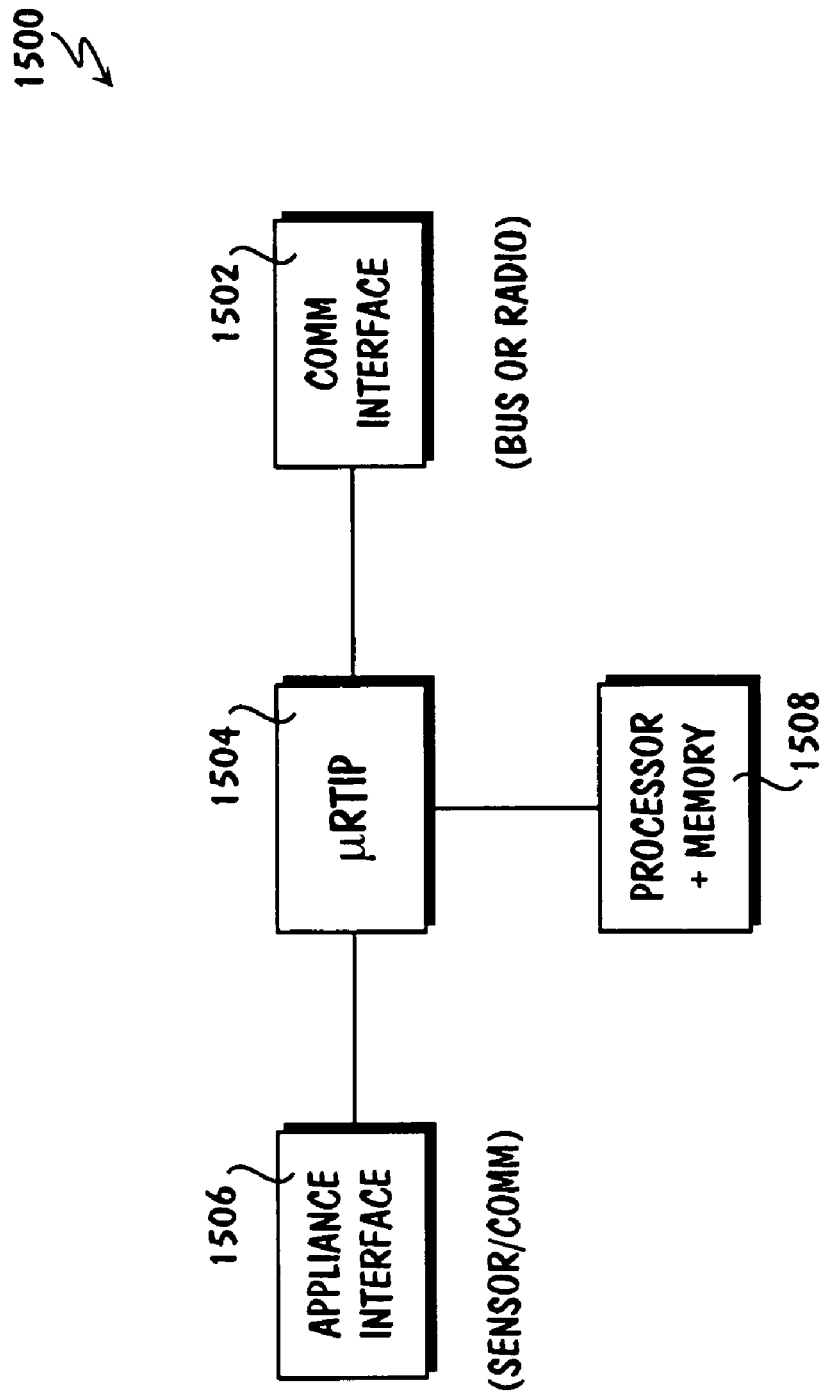
FIG. 15 is a port architecture of an embodiment.

FIG. 15 is a port architecture 1500 of an embodiment. The communications interface 1502 includes at least one line driver, protocol translation, and packet encapsulation, but is not so limited. When coupled to the RTIP, the communications interface 1502 serves as the interface to the RTIP.

The micro RTIP 1504, or µRTIP, may simply be a bus, possibly of the same type as in the RTIP but with fewer couplings. If it is the same as an RTIP, the communications interface to the RTIP becomes trivial. Alternatively, the µRTIP 1504 functions along with many functions of the two interfaces can be performed by the port's real-time processor, for example, within a tag.

When IP networks are coupled to both sides of the port 1500, a small router directs packets from the appliance interface 1506 (for example, from a sensor, actuator, or communications device) to be queued in memory 1508, and possibly be examined by the processor (for example, for security purposes). Alternatively, if used as a tag, the appliance interface 1506 is to a sensor and the communications interface is to a radio. The processor then directs the activities of the tag.

Service Discovery and Application Program Interface

Internet service discovery protocols such as Jini technology demand large memory and computational resources, and provide limited network self-assembly functions. By contrast, the WINS vehicle internetwork enables complete self-assembly of a network and its applications, including coupling to services in outside networks. These methods are used for vehicular applications so that minimal expertise is required of the vehicle operator or installers of new devices, and so that the network components can be low-cost. After self-assembly has occurred using these protocols, Jini or a similar protocol sitting above the IP layer can be invoked in the higher-end devices so that standard software applications can be used. For clarity of discussion of self-assembly and service discovery, the descriptions herein assume that the proxy is hosted on the application processor of the gateway. However, alternative arrangements accommodate hosting of proxy components.

Self-assembly and service discovery occur in two distinct fashions. For devices with direct port node couplings to buses leading to the gateway, the gateway directly mediates the assembly functions, analogous to a network gateway in star topologies. For devices that belong to a subnetwork, a separate protocol is used for subnetwork assembly. The port node that interfaces the subnetwork to the bus then passes service requests to the gateway. In this instance, the port node may for example be either a PNP device or a non-IP router.

When attaching to a network a node acquires synchronism, announces its presence, is authenticated, and publishes the modes by which it can communicate. Service discovery makes the node aware of the resources available in the network. A node joining the network first listens to traffic to synchronize to the control channel of the gateway. It then responds in one of the slots provided for nodes to request service, indicating its identity and capabilities with a unique code. The gateway can then consult its security database to determine whether the device or network of devices attached to the port node is authorized to communicate. If any devices are not authorized, a sequence of operations as described herein is pursued to establish authorization or instruct the port node to prevent any traffic from the unauthorized devices from being passed on to the network.

The gateway maintains a database for both policies (e.g., security, service configurations) and data, with permanent and transient entries. The policy database enables port nodes to download instructions in support of particular services. Consequently, not all services need to permanently reside on the port nodes. Port nodes can request participation, or respond to invitations, for particular services by exchanging codes that index the services of interest. One code, for example, could be reserved for establishing a Jini session, setting in motion the process of invoking higher levels of service discovery. Another code might be a query for resources of some particular type, to which the gateway responds with a listing of addresses of nodes. New policies can be added to the database either through the system's external connections (mediated by the gateway) or through the bus.

Transactions among nodes on the bus use the gateway in mediating access to the bus, when the gateway assumes the role of a master. However, unless a message is to be passed through the gateway to another network, it will not usually need to decode transmissions from one port node on the bus to another port node. The gateway may or may not mediate access to a multi-cast group performing some particular function, beyond reservation of slots. Involvement by the gateway in such operations is determined by whether the nodes are capable of managing the session themselves. Consequently, the gateway is an active participant in mediation when the nodes are not capable of managing the session.

The gateway of an embodiment mediates services that go beyond any single network to which it is coupled, including multiple networks within the vehicle and external networks. The gateway policy database therefore contains protocols for service discovery in diverse networks. External network connections further account for the variable communication rates that are typical of links to vehicles. For example, service islands of high-speed connectivity (e.g., within a garage or at a service station) may exist, providing low-cost and high-speed download capability (e.g., for audio or video entertainment). The gateway may thus command download when communication conditions are favorable in anticipation of later demand. To this end, the gateway accesses mass storage so that such transient material can be stored until it is used. Note, however, that while the gateway may be executing this service policy, some other device connected to the network can be in charge of the requests, and be the origin of the policy. The gateway in this circumstance is in the role of mediating the competing demands for resources according to the priorities expressed in their service requests.

The service architecture includes a number of levels, any subset of which can interact. Services may be confined to subnetworks attached via a port node, in which no demands are made of the general vehicular network. Services may be confined to one bus attached to the gateway, or may involve both a bus and subnetworks connected to that bus. Alternatively, services may also include connections outside the vehicle. Such a network resembles the Internet in many respects in that heterogeneous networks are tied together with gateways that perform routing and queuing functions. In the WINS vehicle internetwork, however, the port nodes and the gateway take further responsibility for self-configuration and security authentication, with minimal human operator involvement. Moreover, the components are themselves low cost, in contrast to Internet routers and gateways.

FIG. 16 is a vehicle internetwork application programming interface (API) structure 1600 of an embodiment. The vehicle API 1600 lists services 1602, host 1604, and API examples 1606. Services 1602 include application support, database services, routing, security, network management, and deployment. The application support, database services, and routing are hosted on the gateway. The security, network management, and deployment functions are shared among the gateway and nodes.

Figure 17:
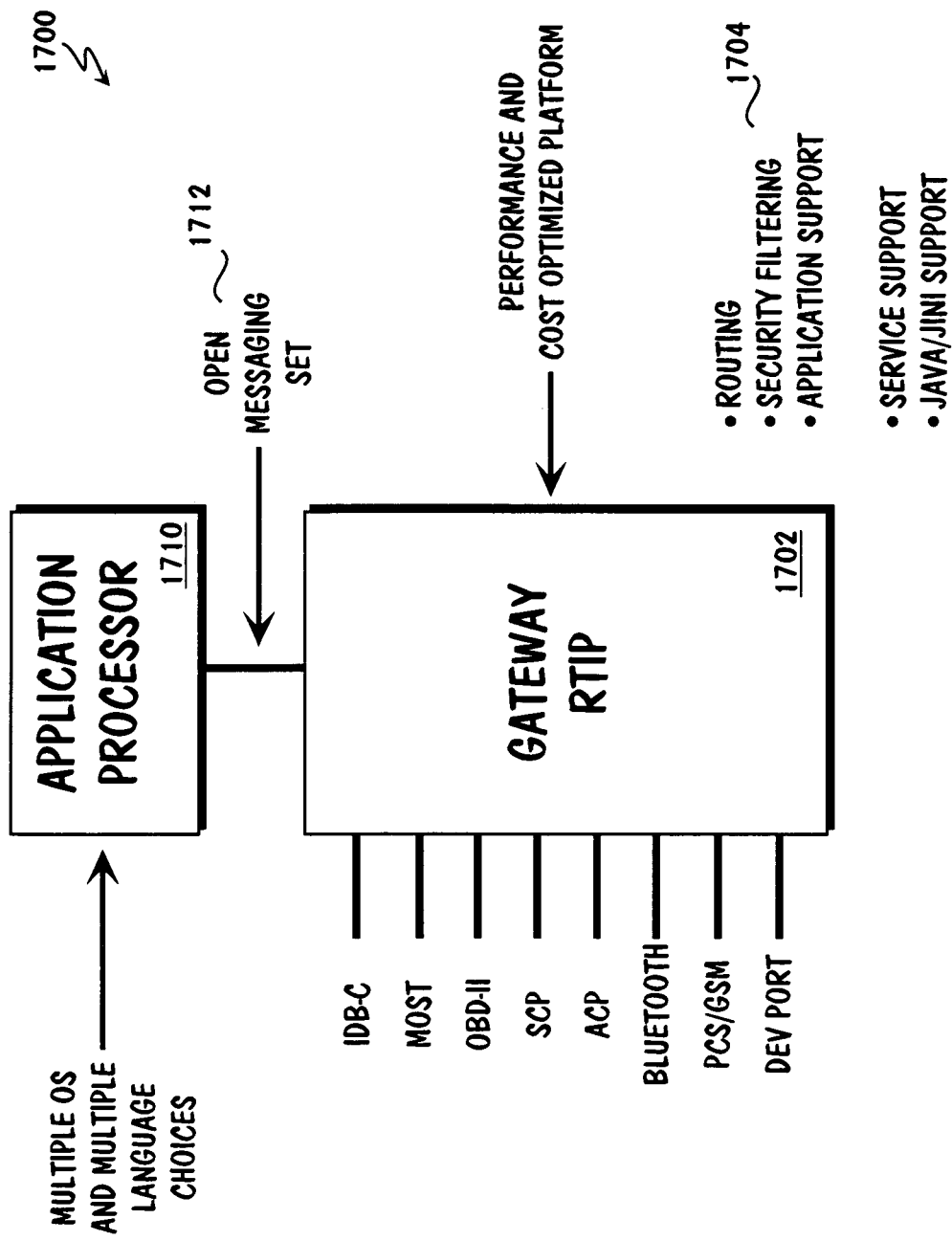
FIG. 17 shows a gateway hardware and software interaction of an embodiment.

FIG. 17 shows a gateway hardware and software interaction 1700 of an embodiment. The gateway RTIP 1702 is performance and cost-optimized for supporting the lower level functions 1704 such as routing, security filtering, and application support for higher level applications. The API 1710 includes an open messaging set 1712 that enables a variety of platforms to sit on top of the RTIP 1702. Such application processors 1710 can then use any of a number of different operating systems and programming languages being at once shielded from the real-time operations of the RTIP 1702, yet able to control the functions being executed and access raw data as required.

Figure 18:
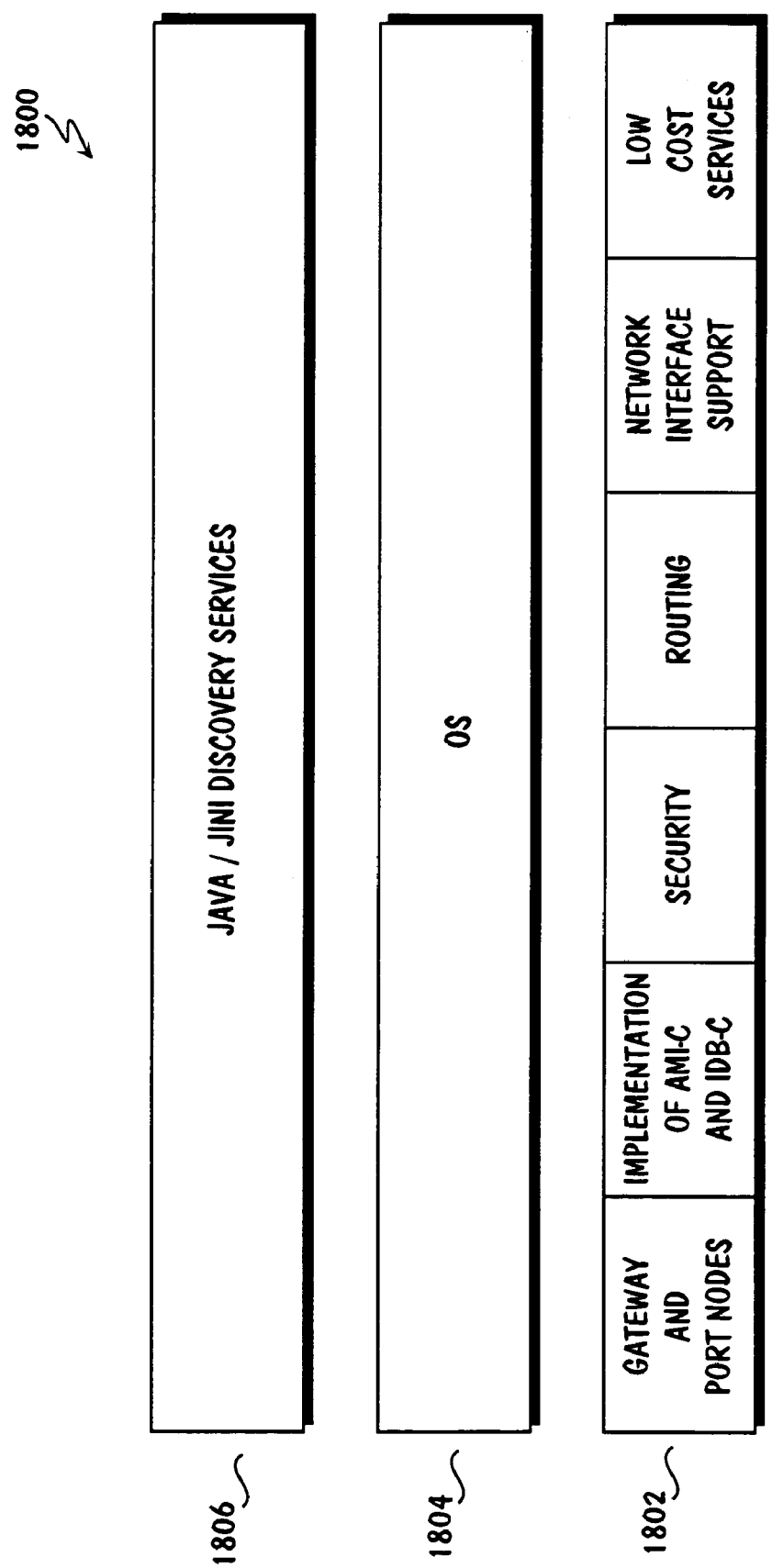
FIG. 18 shows application programming interface (API) layering of an embodiment.

FIG. 18 shows application programming interface (API) layering 1800 of an embodiment. The lower level 1802 includes functions particular to the vehicle internetwork, including gateway and port node operation, implementation of AMI-C and IDB-C bus protocols, security, routing, network interface support, and low-level services. The software for these functions has a relatively small footprint that enables the devices to be low-cost. At the same time, the APIs permit higher levels 1804 and 1806 to access parameters or data managed at the lower level 1802 so that information on the state of the network can be retrieved, and parameters re-set to control its behavior. The application processor in the gateway or in consumer devices attached to the gateway includes an operating system (OS) 1804 that interfaces with the lower level 1802, and enables higher level applications 1806 developed for more powerful platforms to be used. For example, Java or Jini 1806 may run on top of this OS 1804, so that standard applications developed for broad consumer markets can be executed.

Figure 19:
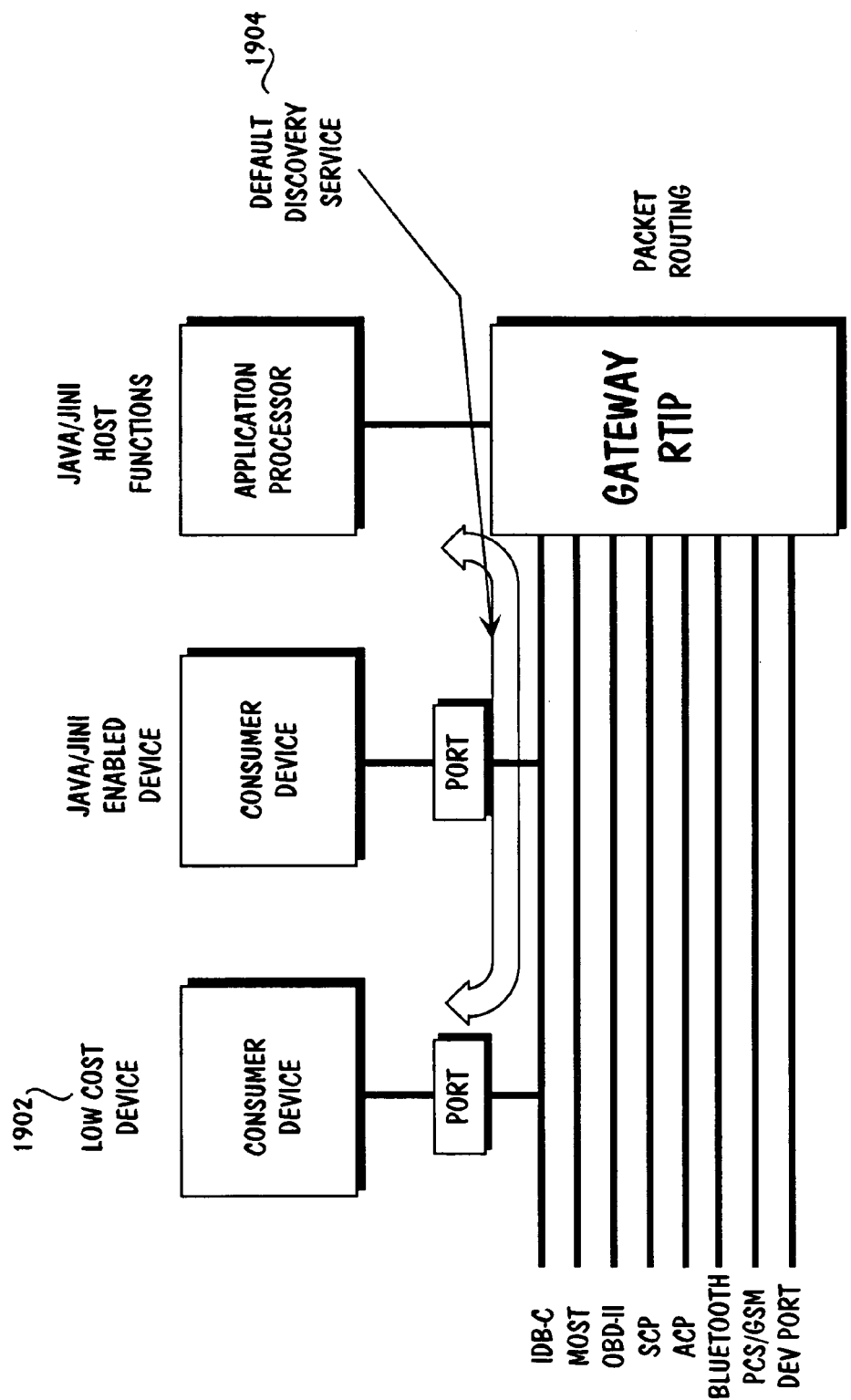
FIG. 19 shows default device discovery in a layered set of APIs of an embodiment.
Figure 20:
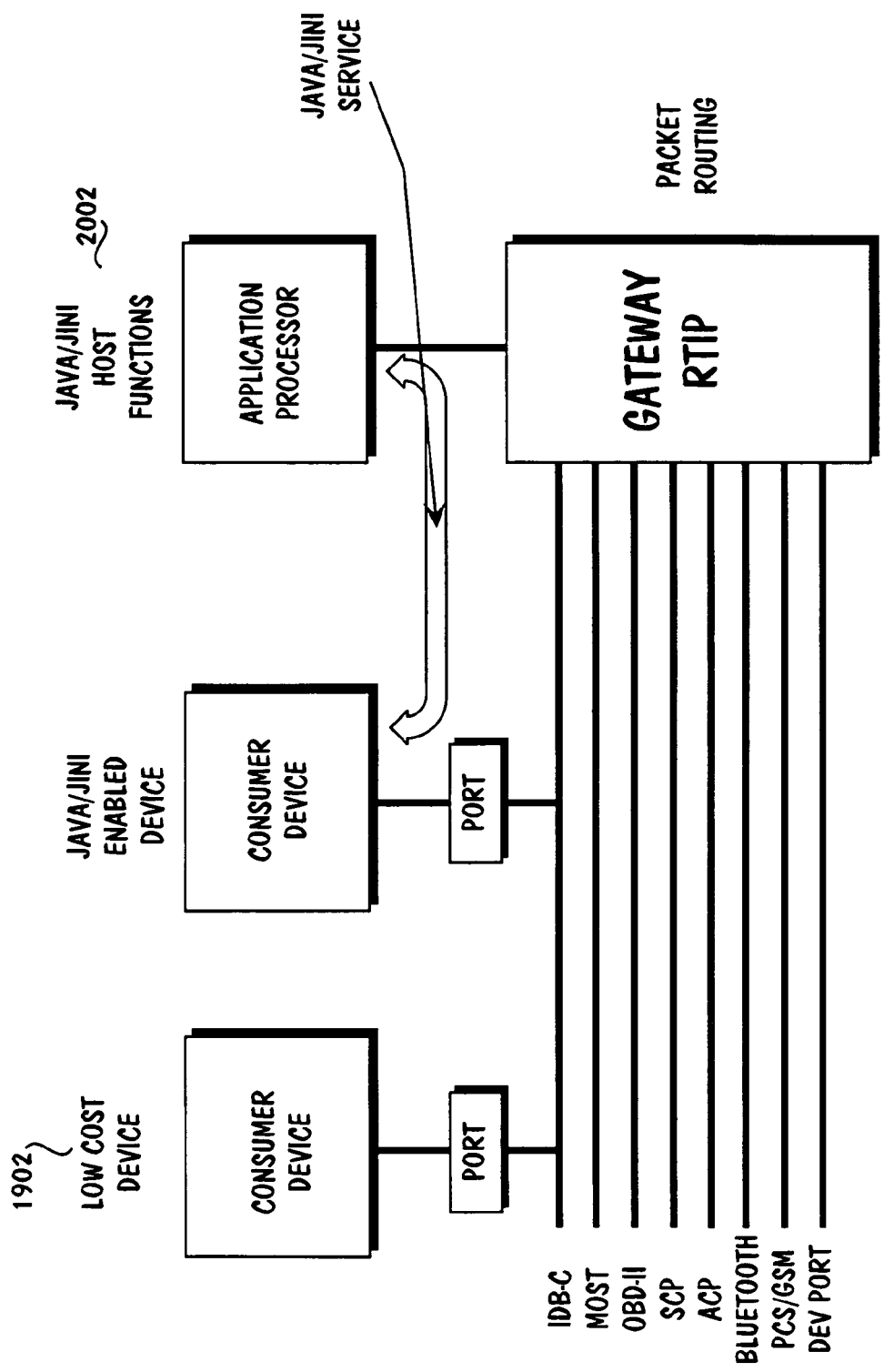
FIG. 20 shows Java/Jini application enablement in a layered set of APIs of an embodiment.

FIGS. 19 and 20 show an example of how a layered set of APIs work in an embodiment. FIG. 19 shows default device discovery of an embodiment. A low cost consumer device 1902 coupled to a port node becomes integrated into the network with the default discovery service 1904, i.e., the lower layer APIs related to service discovery. The device goes from a state of having no knowledge of the network, to becoming an integral part of it. All the levels up to the link layer are dealt with, as is a set of applications.

FIG. 20 shows Java/Jini application enablement in an embodiment. The default discovery process takes place, but in this example it is determined that the device 1902 can support Java and Jini 2002. Thus, using the same lower level protocols, a higher level application discovery can now take place using Jini, leading to support for more sophisticated application sessions involving, for example, several consumer devices, the gateway, and remotely located devices on an external network such as the Internet.

Vehicle internetwork service discovery of an embodiment among non-Java capable devices uses a scalable protocol, wherein the protocol can be used across a broad range of devices using the WINS technology. The service discovery protocol may be configured to support a single node as a focal point or proxy. However, the protocol also supports the notion of a service region, wherein nodes are unwilling to offer or request services from distant nodes or nodes which lack security authorization. The service region can depend on the priority expressed in a service request. Thus, all messages include fields expressing priority and reach of the message, as well as identifiers for the services being registered or requested.

The service discovery protocol includes a set of messages and transactions that enable the support of a broad set of distributed services, as well as services that are coordinated by one central node. The messages and transactions include, but are not limited to, find service locator messages, service advertisement messages, service queries, service query responses, service code translations, and service requests.

The find service locator message is a multicast that includes a range indication. For the vehicle internetwork, this message can do double duty that includes identifying a new node to the network, since all find service locator messages are routed to the proxy. For a WINS NG network, potentially every node has a service registry, and so this message indicates the region over which nodes are to be identified.

The service advertisement message is provided to service locators and includes codes for available services. Message components can also include a status for serving requests including withdrawal of service availability, and classes of nodes that may request service. In the vehicle internetwork, the proxy will determine classes of nodes that are eligible for such services under the security protocol. The codes include, but are not limited to, Bluetooth Service Discovery Protocol (SDP) codes, and other application-specific codes that indicate Java-capable nodes, or codes related to authentication that implicitly identify services. A code can be reserved for service locators.

The service query is a request to service locators indicating codes for services requested, propagation range of the query, and priority of use. The service query can also request lists of services.

The service query response is a response to a service query from a service locator that includes addresses of nodes that can provide services. The addresses can be formatted as prioritized lists. The address may actually be the proxy address in some cases when the proxy performs code translation. The proxy will deny requests that violate the security protocol.

Service code translation is performed so that applications running on the nodes that are involved in services are able to provide or request a service identified by the code. In some cases, this translation can be performed by the proxy.

Service requests are requests for service from nodes to devices whose address has been provided by the service locator. Service requests indicate service codes and priority levels.

Mobility is an important factor in service discovery and data integrity. Atomic transaction methods are used to deal with intermittent connectivity. While atomic methods are standard, for example, in distributed database problems (e.g., the Commitment, Concurrency and Recovery (CCR) application service element for maintaining integrity in shared access applications), the problem in mobile systems is not always a matter of preventing multiple users from making inconsistent changes to a database. Rather, the issue associated with the WINS vehicle internetwork is to efficiently download and upload data between a mobile and any number of fixed terminals.

For example a vehicle may upload operating system software or entertainment products through short range, low-cost links. However, it may move beyond the range of one such short range transmitter before a transaction is complete.

When this happens, such information is logged in the database so that when connectivity is established with another transmitter the record download begins again where it left off. Alternatively, the mobile unit can record how many packets of a message have been received or transmitted, and instruct the fixed infrastructure at which location in the record to begin retransmission. The database system for mobility management could in this case predistribute code and data to projected Internet gateways along the likely paths in anticipation of the arrival of a specific vehicle, or a vehicle that belongs to a class, all of whose members use the same data. This minimizes down-time of the wireless links while waiting for information over backbone satellite or wired networks.

Conventional atomic transaction methods are appropriate to managing the distributed copies of messages to mobiles, in that they should delete data that has already been successfully transmitted to all members of a class, and forward only data within a session that has not already been transmitted. In this way, the backbone network transmits less data over long hauls, and has lower average storage requirements. With such atomic transaction methods, the requirement for continuous high-speed coverage is eliminated, and flexibility for transmission of records over multiple communication means is provided. Service discovery transactions can proceed in a similar fashion. In effect, the proxy and remote database interact through a variety of means, possibly accessing systems such as the vehicle navigation system to predict the best links to use.

Bus Protocol

Embodiments of the WINS vehicle internetwork enable more efficient usage of the associated buses. In one embodiment, more signal processing takes place at the source (e.g., sensors) so that processed rather than raw data is sent to other components of the network. Also, multiple low speed devices may be coupled on a separate physical wire, with aggregation of their data at an interface device to the IDB-C bus (e.g., a port node), thereby lowering the cost of their communications connectors.

In an alternate embodiment, higher speed communications are enabled in time slots reserved using the IDB-C protocol. Access requests are broadcast and slots assigned. A proprietary protocol can then be used during that slot to achieve a high speed burst of data. This approach has the communication devices for the parties to the conversation understand both the high speed and the IDB-C protocol, but does not require other devices to have anything more than IDB-C. Thus, support for heterogeneous protocols is automatic, and gradual upgrading can take place.

Through the use of subnetworks, devices with very low speed requirements can avoid having to implement the IDB-C protocol. Further, by using the IDB-C protocol simply to schedule transmissions, higher speed devices can be added to the network. It is also possible to use line drivers for other applications (e.g., 10 MB ethernet), with minimal modifications, thus leading to low costs. The result is that devices with a huge range of communications requirements co-exist on the same network.

WINS Vehicle Internetwork Embodiments and Applications

WINS Vehicle Internetwork Embodiments

Figure 21:
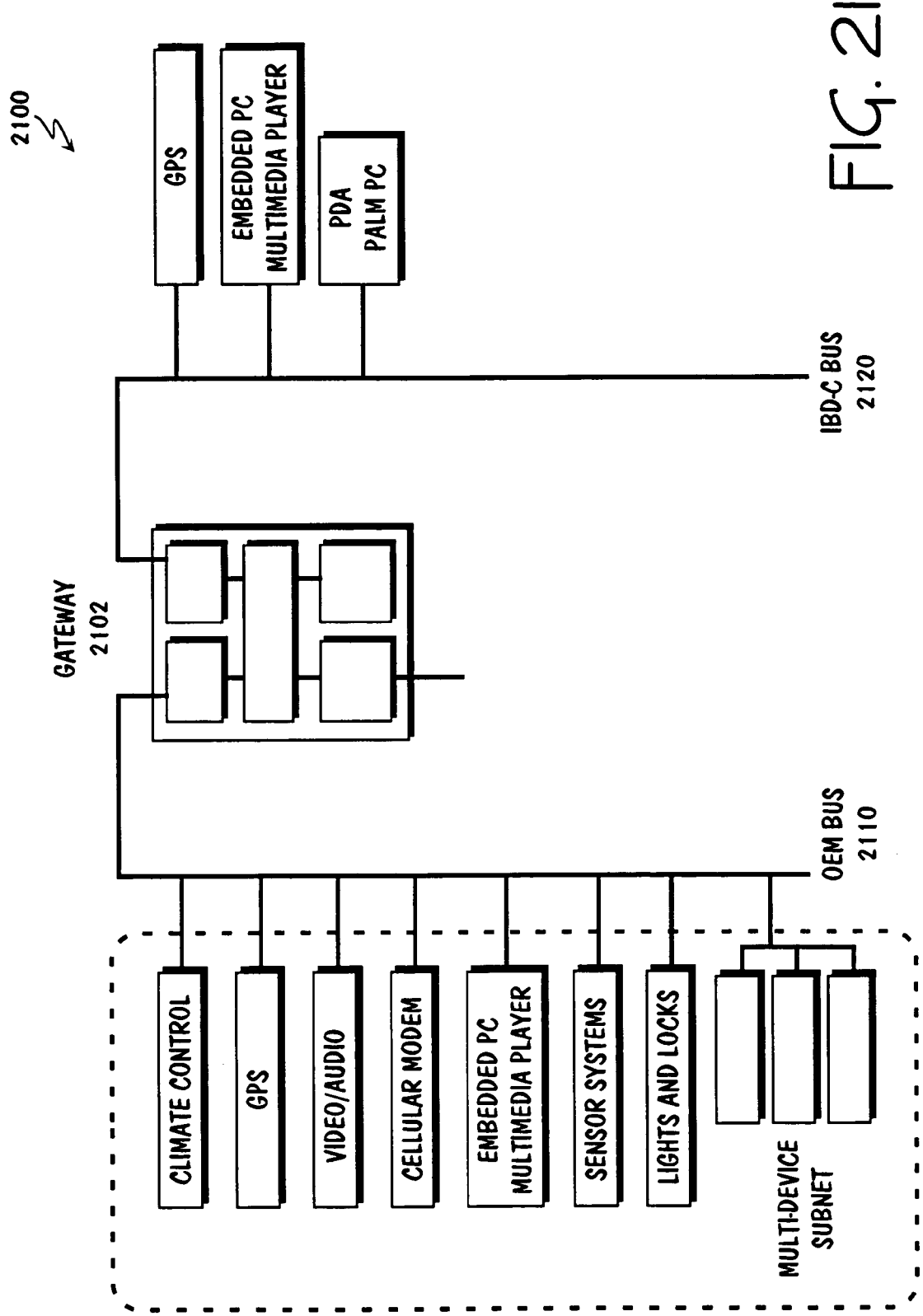
FIG. 21 is a WINS vehicle internetwork of an embodiment.

FIG. 21 is a WINS vehicle internetwork 2100 of an embodiment. The vehicle internetwork 2100 includes at least one gateway 2102 coupled among an OEM network 2110 (depicted as a single bus, but not so limited) and an IDB-C bus 2120. Vehicle functions supported on the OEM network 2110 include climate control systems, positioning systems like Global Positioning System (GPS), video/audio systems, cellular systems, embedded PC multimedia systems, vehicle sensor systems accessed via the OEM OBD-II port, and control of lighting, door locks, and other functions via the SCP bus, but are not so limited. Devices supported on the IDB-C bus 2120 include, for example, GPS units, PC-based multimedia devices, and PDAs.

The gateway of an embodiment includes an application processor which hosts the proxy, and consequently supports the network management, service discovery, security, and wireless access. The gateway bridges among the IDB-C, SCP, OBD, local area wireless, and cellular wireless Internet protocols. The port nodes interface the consumer electronic devices to the IDB-C bus, and thence to the gateway with its many couplings.

The gateway also includes a wireless access port for local area networking. The wireless access port includes a 2.4 GHz frequency-hopped spread spectrum modem channel, functionally equivalent to the Bluetooth wireless standard. This port provides connectivity to a local area wireless Internet access point. This link provides secure, local area Internet and web access to the vehicle system.

Figure 22:
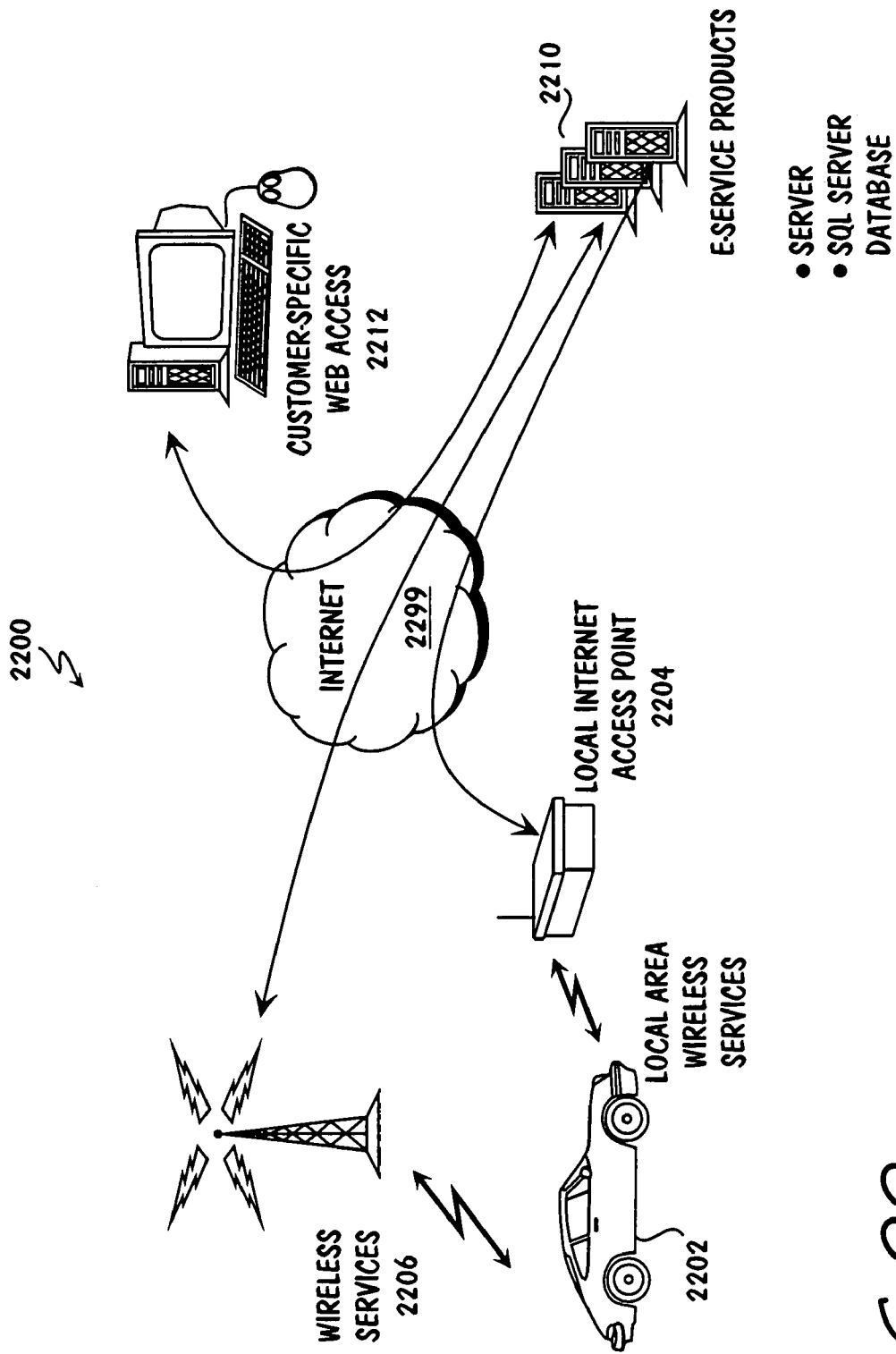
FIG. 22 is a WINS vehicle internetwork system of an embodiment.

FIG. 22 is a WINS vehicle internetwork system 2200 of an embodiment. The system 2200 provides self-assembling components that form a wireless network among vehicles 2202 and local sites 2204, which can, for example, be located in a residence, service station, maintenance shop, or parking lot. Connectivity is available for vehicle service, and data transfer to and from the vehicle 2202 (e.g., for maintenance history, email, linkage to the Internet or to provide entertainment services). The internetwork further includes bridging among the vehicular networks 2202 and cellular modems or services 2206, which may for example provide PCS and GSM wide-area access to the Internet 2299. Among the functions enabled are remote access to controls, diagnostic data and security functions via standard Web interfaces, and exchange of email. Other electronic services supported include access to a server 2210 enabling global Internet access. With this access, a SQL server can be used to provide database services for management of vehicle data systems. A web server 2212 can provide secure access for data upload and download between authorized users and vehicles.

Figure 23:
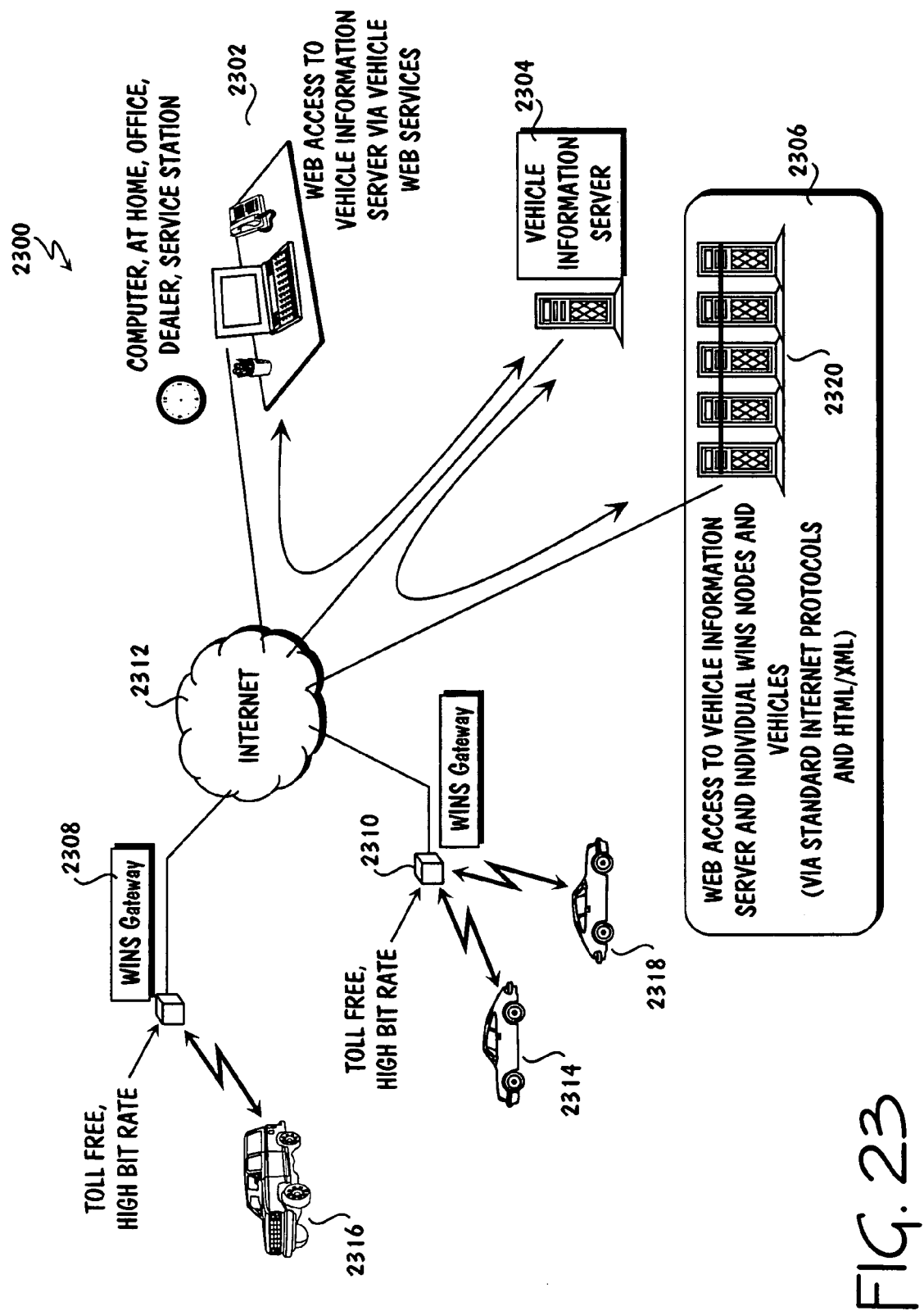
FIG. 23 is a WINS vehicle internetworking system of an alternate embodiment.

FIG. 23 is a WINS vehicle internetworking system 2300 of an alternate embodiment. Vehicles 2314, 2316, and 2318 can each be manufactured by a single manufacturer or different manufacturers. The vehicle manufacturer installs the WINS internetwork system components in the vehicles to allow internetworking throughout the life of each vehicle. The manufacturer's existing information technology systems 2306, including WINS vehicle information servers 2320, are used to participate in the WINS internetworking system. Through gateways 2308 and 2310 and the Internet 2312, world wide web access to WINS vehicle information servers is provided to vehicles 2314, 2316, and 2318. Because communication in the internetworking system is two-way, WINS vehicle information servers may also access individual nodes, such as gateways 2308 and 2310, and individual vehicles. The WINS vehicle information servers can also be placed in any location apart from the manufacturer's existing information technology systems 2306. The WINS vehicle information server 2304 is an example of a vehicle information server that can exist anywhere.

Computers having access to the web, such as computer 2302, have access to nodes, vehicles, and WINS vehicle information servers. Computer 2302 can, for example, be a home, office, vehicle dealer, or service station computer. Communication among vehicles 2314, 2316, 2318 and any of the gateway nodes, such as gateways 2308 and 2310, is accomplished through wireless links that do not require universal high-speed services, but may include a mix of low-speed wide area couplings and high-speed short range couplings. Communication among gateways 2308 and 2310 and the Internet 2312 can, in various embodiments, be accomplished using wireless or wireline methods.

In vehicle maintenance applications, the WINS vehicle internetwork can include WINS NG nodes. These nodes provide low cost, low power, compact intelligent nodes that can be coupled to vehicle diagnostic ports. Such nodes can communicate using a number of communication modes, including the FCC industrial, scientific, and medical (ISM) band spread spectrum channels. These channels, in addition to providing robust communication, are unlicensed, thus eliminating wireless access subscription fees for short range coverage. Power limitations, however, may affect wide area coverage, so communication over such channels may be supplemented by lower speed access over licensed channels (e.g., via cellular modems), with access mediated by the proxy. The WINS NG nodes link to local area WINS NG bi-directional gateways that access Internet services via multiple channels. The WINS NG node manages the vehicle access port, logs vehicle information, finds WINS NG network Internet access, and immediately enables a wide range of valuable services at small incremental cost.

WINS Vehicle Internetwork Applications

The WINS vehicle internetwork can be used in a wide variety of applications, including vehicle assembly, vehicle maintenance, fleet management, fleet reliability analysis, anti-theft systems, support for entertainment systems, coordination of vehicle systems with consumer electronics, and targeted advertising. The WINS vehicle internetwork includes functionality that provides numerous advantages while enabling this broad range of vehicle reliability and consumer services. The functionality includes, but is not limited to: self-assembly and authentication from physical layer through to applications; providing the ability to control physical parameters using APIs while using high-level and standard software tools; separating real time and non-real time processing; flexible proxy/port architecture; integrated database management; flexible processor architecture; Internet access and control of network resources; and use of web tools and remote databases. Thus, individual vehicle systems can be monitored, queried, and upgraded on a global scale. Internet services provide remote access that can be integrated into the operations of a vehicle manufacturer. Vehicle internetworking provides benefits through the entire vehicle life cycle from manufacturing, distribution, sale, fleet or individual owner information, maintenance, regulatory compliance, and used vehicle sales information.

In the area of vehicle reliability services, the same basic infrastructure can be used throughout the life cycle of a vehicle, from factory assembly through operation of the vehicle to ensure its reliable operation. During vehicle assembly, for example, WINS NG networks can provide low-cost monitoring of the reliability of an assembly process. The WINS NG network self-assembly features enable convenient retrofit of factories, condition-based maintenance for assembly machinery, and attachment of nodes to parts for tracking and inventory purposes. Further, WINS NG networks include interaction with standard databases, and thus the assembly history of the vehicle can be stored using convenient software. When the WINS vehicle internetworking system is installed in the vehicle, the OBD port can be remotely queried and the test operation of the vehicle added to this database, providing the capability of relating any flaws to assembly conditions. In conjunction with data collected over the lifetime of the vehicle, such a database of conditions of the vehicle from assembly through break-down can be used to improve assembly methods.

Further in the area of vehicle reliability services, data access to vehicles can encompass many measurement capabilities that are of use to both the vehicle owner and the manufacturer in maintenance support over its lifetime. The On-Board Diagnostics standards, OBD-I and OBD-II, provide access to a wide range of parameters useful in assessing the status of vehicle systems. In one embodiment, an application hosted on the gateway application processor collects histograms of the different parameters, and stores records that deviate from standards predicted by the manufacturer. These records and the performance histories are downloaded to a database maintained by the manufacturer, or some third party, via low-cost Internet couplings. These Internet couplings may be, for example, over a short range radio link when the vehicle is parked at the residence of the owner. Diagnostic and prognostics software can then be run, and if a problem is suspected, the vehicle owner is alerted to the need for maintenance. Further, this software can command changes in what data is collected, as more information is required in tracking down particular problems.

In a complimentary application, if on-board vehicle diagnostics indicate an emergency situation, the vehicle operator is immediately alerted and provided with information on the nearest repair locations. The alerting, as a result of its higher priority, may use higher-cost wider coverage communications such as two-way paging or cellular telephones.

In yet another application, driving habits of the owner can be analyzed over time and correlated to the apparent wear of vehicle systems. This information can be used by the manufacturer in designing new models to conform to the manner that the vehicles are actually used, or to alert drivers to habits that may result in costly repairs if continued. Moreover, the ability of vehicle internetwork servers to issue queries that also affect how data is collected can lead to deeper investigations of priority events, without requiring this level of detail over all time or across whole fleets.

The WINS vehicle internetwork also enables convenient software upgrading, through the many communications means available, and the management for low-cost access performed by the proxy. Further, the self-authentication and self-assembly features enable incorporation of new devices into the network that upgrade the hardware capabilities, and thus support for more sophisticated applications (e.g., enhanced vehicle prognostics and diagnostics). For example, additional diagnostic devices such as WINS NG nodes can be conveniently added. These additional diagnostic devices supplement the information provided through the OBD port at the time of manufacture.

The WINS vehicle internetwork further enables auditing of repairs performed on the vehicle. Since a database of vehicle performance is assembled prior to the repair, an expanded diagnostics capability is enabled, potentially available to each of the owner, repair shop, and manufacturer via the Internet and using standard web browsing tools. This reduces the errors made in diagnosing the problem, since the repair shop will now have access to how the vehicle is performing in a variety of conditions, rather than only its static performance in the repair shop premises.

The performance of the vehicle after the repair can be compared to its history prior to the repair to determine whether it was effective. Thus, repair shops and the manufacturer can both audit their procedures, potentially over entire vehicle fleets, to determine which procedures are the most effective for particular problems. This will ultimately lower the cost of repairs, reduce fraudulent repair practices, and enable comparisons to be made among different repair shops. Further, such maintenance records can be made available at time of sale or re-sale of a used vehicle. Thus, more complete information can be obtained, enabling more realistic pricing and more equitable resolution of disputes regarding pre-existing conditions.

The collection of actual vehicle performance data is extremely valuable for the manufacturer as the above examples illustrate; for the first time assembly conditions, driving habits, and maintenance operations can be correlated to vehicle performance. The WINS vehicle internetworking system enables economical operation of these functions through the data and communications management performed by the proxy, and the use of WINS web servers with their couplings to standard databases. Information about particular vehicles is also valuable to the owner, but aggregated information over fleets can greatly assist a manufacturer in providing upgrades, deciding upon recalls, or designing future generations of vehicles. Additionally, it can assist in regulatory compliance.

Such information about actual use can also be very valuable to owners of fleets, such as rental car or trucking companies. This can assist in pricing of services, scheduling of maintenance, and determining which makes of vehicle provide the most robust performance. Such agencies can maintain high-speed Internet couplings at rental locations or depots, so that even without wide-area deployment of high-speed services they can obtain frequent updates on vehicle status. Inventory management is also assisted since vehicle locations can be implicitly determined by tracing the routes of communications sessions, or explicitly determined if the vehicle includes a navigation system. Further, customer satisfaction can be enhanced through automated help desks that are reachable by the wide area communications means of an embodiment. In this manner, personalized services can follow individuals as they move among different vehicles.

In the area of consumer services, the WINS vehicle internetwork of an embodiment provides a number of applications including, but not limited to, coordination of vehicle systems, vehicle entertainment uploads, targeted advertising, privacy profiles, and owner/operator profiles. The gateway of an embodiment can coordinate a wide range of vehicle systems from actuators to communications ports. Since the APIs provide high-level software access down to the physical layer, standard methods can be used to provide unprecedented interaction among vehicle and consumer systems, thereby enabling a wide variety of applications.

In the event of the theft of the vehicle or other unauthorized vehicle operation, the owner can report its loss and initiate any of a sequence of procedures to enable its recovery via the WINS vehicle internetwork. For example, the proxy can be paged to interface with the vehicle navigation system to continuously report location to law enforcement agencies. In a complementary measure, when the vehicle comes to a halt, the computer controlling the engine can be commanded to shut down so that the vehicle cannot be operated. In a refinement, the vehicle slowly comes to a halt when law enforcement enters its vicinity. In yet another measure, alarms, loud speakers, and other devices can be commanded to operate to render unobtrusive vehicle operation impractical. Such scenarios further underscore the need for the security protections provided by the WINS vehicle internetwork, since unauthorized command of these activities can be extremely damaging.

In another example of coordination of diverse systems of an embodiment, when an incoming voice-call is detected, the volume controls on the stereo system can be automatically damped, and windows closed to reduce the background noise. In this example, systems on the consumer side of the gateway would operate in tandem with controls on the OEM bus. The diverse communications supported also enable other coordinated actions, for example remote vehicle activation to load narrated web news, and to start the air-conditioning (or defrosting) prior to it being entered by the owner. Such actions could for example be coordinated according to a profile of operator preferences, which can be explicitly commanded, or adaptively created through observation of actual operations.

The mobile IP management functions of the WINS vehicle internetworking system enable economical uploading of video or audio entertainment. The volume of data required for such applications is large, and consequently providing continuous wireless access over large areas can be very costly. However, upload costs can be essentially free at short range, for example, if the residence is equipped with a short-range high-speed wireless link. In another embodiment, audio entertainment can be uploaded at filling stations or other locations in which the vehicle is likely to be within a short distance of a high-speed transmitter.

Once in a vehicle, consumers are more likely to consider making purchases. Of particular interest are retail outlets within a short driving range. A variety of means exist to multicast this information to vehicles, including short range radio broadcast and interactive web sessions based on user preferences. Communication devices and applications for interaction with the WINS vehicle internetwork may be paid for by the advertising service, or Internet access provided for free on condition of subscription to such services.

The WINS vehicle internetwork security functions also enable privacy operations. Particularly sensitive matters include vehicle location and speed, and conversations within the vehicle that may be accessed by the hands-free microphones of a cellular system. The owner must have control over which parameters are uploaded, and in what level of detail (aggregation). At different times and places and for different purposes (e.g., law enforcement, manufacturer, vehicle service) the preferences may change. The WINS vehicle internetwork of an embodiment manages this by supporting privacy profiles, resident both on the vehicle and some remote site, which the owner accesses via passwords. Operators can similarly possess profiles that pass, for example, to rental vehicles, but which do not supersede the owner's profile (of course, the owner's profile may permit temporary replacement by an authorized operator).

The vehicle internetwork of an embodiment can incorporate many vehicle operator/owner preferences beyond privacy concerns into owner profiles. The owner profile can have priority over other profiles, with the ability to allow authorized operators (e.g., someone who has rented the vehicle) to upload their preferences. In this way, preferences for privacy, seat and control position, appropriate actions during cell phone calls, and quality of service for external network couplings can follow operators between different vehicles. Such information can be embedded in smart cards, but is not so limited.

The description herein of various embodiments of the invention has been presented for purpose of illustration and description. It is not intended to limit the invention to the precise forms disclosed. Many modifications and equivalent arrangements will be apparent.

What is claimed is:

1. A method comprising:
coupling an Original Equipment Manufacturer (OEM) bus, an Automotive Multimedia Interface Consortium (AMI-C) bus, and an external network via a gateway device, wherein the OEM bus interconnects OEM vehicle systems that perform vehicle functions, and the AMI-C bus interconnects AMI-C devices;
authenticating devices connected to the AMI-C bus at the gateway device using an application processor, wherein authenticating devices connected to the AMI-C bus at the gateway device using an application processor comprises:
consulting a security database to determine whether a device attempting to access the AMI-C bus via a port node is authorized to communicate with the AMI-C bus; and
in response to determining that the device is unauthorized, instructing the port node to prevent traffic from the unauthorized device from being passed from the device to the AMI-C bus;
routing communications from at least one source to the application processor using a real time processor in the gateway device, the at least one source being selected from the group consisting of the OEM vehicle systems, the AMI-C devices, and the external network;
hosting vehicle applications associated with the OEM vehicle systems and the AMI-C devices on the application processor; and
receiving an external communication at the gateway device and responsively altering a function of a vehicle system of the OEM vehicle systems.

2. The method of claim 1, wherein the function of the vehicle system is selected from the group consisting of vehicle control functions, security functions, diagnostic functions, and network access functions.

3. The method of claim 1, further comprising using the gateway device to provide a firewall between the AMI-C bus and the OEM bus.

4. The method of claim 3, wherein the firewall prevents AMI-C devices connected to the AMI-C bus from disrupting essential functions of the vehicle.

5. The method of claim 1, wherein the gateway device is coupled to a local development network, and wherein the gateway device acts as a bridge between the OEM bus, the AMI-C bus, the external network, and a local development network.

6. The method of claim 5, wherein, in bridging the OEM bus, the AMI-C bus, the external network, and the local development network, the gateway device provides a function selected from the group consisting of protocol translation, security, and privacy functions.

7. The method of claim 5, wherein the local development network supports wireless transfer of information among a remote information station and at least one of vehicle systems and AMI-C devices.

8. The method of claim 5, wherein the gateway device selects a communication method for communications between vehicle systems on the OEM bus, AMI-C devices on the AMI-C bus, the external network, and the local development network.

9. The method of claim 8, wherein an internet coupling provides a low-cost communication method, wherein a wider coverage communication selected from the group consisting of two-way paging and cellular telephone communication provides a higher-cost communication method, and wherein selecting a cost effective communication method comprises:
selecting the low-cost communication method for low priority communications; and
selecting the higher-cost communication method for high priority communications.

10. The method of claim 9, wherein the low priority communication is a communication selected from the group consisting of uploading of video entertainment, uploading of audio entertainment, software upgrading, transfer of vehicle reliability records and transfer of vehicle performance histories.

11. The method of claim 9, wherein the high priority communication is a communication relating to an emergency situation detected by on-board vehicle diagnostics.

12. The method of claim 1, wherein the OEM bus is connected to at least one peripheral electronic device, wherein the at least one peripheral electronic device is selected from the group consisting of a climate control device, a position location device, a Global Positioning System device, a sensor device, a switch cluster, and a device subnetwork, and wherein the AMI-C bus is connected to at least one peripheral AMI-C electronic device, wherein the at least one peripheral AMI-C electronic device is selected from the group consisting of a pager, a video device, an audio device, a multimedia player, a personal digital assistant, and a wireless local area network port.

13. The method of claim 1, wherein hosting vehicle applications associated with the OEM vehicle systems and the AMI-C devices on the application processor comprises hosting applications associated with at least one of passenger conveniences and vehicle operations.

14. The method of claim 1, wherein the vehicle applications associated with the OEM vehicle systems and the AMI-C devices are upgradable via input from the gateway device.

15. The method of claim 1, further comprising supporting atomic transactions among vehicle systems on the OEM bus, AMI-C devices on the AMI-C bus, and the external network.

16. A gateway device comprising:
an Original Equipment Manufacturer (OEM) bus interface port adapted to communicate with OEM vehicle systems connected to an OEM bus;
an Automotive Multimedia Interface Consortium (AMI-C) bus interface port adapted to communicate with an AMI-C device connected to an AMI-C bus;
a gateway port adapted to communicate with an external network, wherein the gateway device couples the OEM bus, the AMI-C bus, and the external network;
a real-time information processor and an application processor, wherein the real-time information processor is adapted to route communications from at least one source to an application processor, the at least one source being selected from the group consisting of the OEM vehicle systems, the AMI-C device, and the external network; and
an application processor, wherein the application processor is adapted to authenticate AMI-C devices connected to the AMI-C bus and host vehicle applications associated with the OEM vehicle systems and the AMI-C devices, wherein authenticating devices connected to the AMI-C bus comprises:
consulting a security database to determine whether a device attempting to access the AMI-C bus via a port node is authorized to communicate with the AMI-C bus; and
in response to determining that the device is unauthorized, instructing the port node to prevent any traffic from the unauthorized device from being passed from the device to the AMI-C bus, and wherein the gateway device is operable to receive an external communication and responsively alter a function of a vehicle system.

17. The gateway device of claim 16, further comprising a local development port, wherein the local development port is adapted to communicate with a local development network.

18. The gateway device of claim 17, wherein the gateway device is operable to act as a bridge between the OEM bus, the AMI-C bus, the external network, and the local development network.

19. The gateway device of claim 18, wherein, in bridging the OEM bus, the AMI-C bus, the external network, and the local development network, the gateway device is operable to provide a function selected from the group consisting of protocol translation, security, and privacy functions.

20. The gateway device of claim 18, wherein the gateway device is operable to select a communication method for communications among vehicle systems on the OEM bus, AMI-C devices on the AMI-C bus, the external network, and the local development network.

21. The gateway device of claim 20, wherein selecting a communication method comprises:

selecting a low-cost communication method for low priority communications, wherein the low-cost communication method comprises communication via an internet coupling; and selecting a higher-cost communication method for high priority communications, wherein the high cost communication method comprises communication via a cellular connection.

22. The gateway device of claim 16, wherein the function of the vehicle system is selected from the group consisting of vehicle control functions, security functions, diagnostic functions, and network access functions.

23. The gateway device of claim 16, wherein hosting vehicle applications associated with the OEM vehicle systems and the AMI-C devices on the application processor comprises hosting vehicle applications associated with at least one of passenger conveniences and vehicle operations.

* * * * *

UNITED STATES PATENT AND TRADEMARK OFFICE
CERTIFICATE OF CORRECTION

PATENT NO.         : 7,904,569 B1
APPLICATION NO.    : 09/680608
DATED              : March 8, 2011
INVENTOR(S)        : Gelvin et al.

It is certified that error appears in the above-identified patent and that said Letters Patent is hereby corrected as shown below:

On Title Page 3, item (56), under "Other Publications", Line 30, delete "adn" and insert -- and --.

On Title Page 4, item (56), under "Other Publications", Line 7, delete "Newburg" and insert -- Newberg --.

On Title Page 4, item (56), under "Other Publications", Line 9, delete "Proceedsings" and insert -- Proceedings --.

Column 33, line 42, in Claim 4, delete "the" and insert -- a --.

Column 33, line 67, in Claim 9, after "selecting a" delete "cost effective".

Column 34, lines 49-50, in Claim 16, delete "processor and an application processor," and insert -- processor, --.

Column 34, lines 67, in Claim 16, after "prevent" delete "any".

Signed and Sealed this
Twenty-eighth Day of June, 2011

David J. Kappos
*Director of the United States Patent and Trademark Office*